US007909064B2

(12) United States Patent
Natili, Jr. et al.

(10) Patent No.: US 7,909,064 B2
(45) Date of Patent: Mar. 22, 2011

(54) HYDRAULIC ISOLATING MANIFOLD

(75) Inventors: Richard Peter Natili, Jr., Cecil, PA (US); Steven P. Sinka, Butler, PA (US)

(73) Assignee: Emerson Process Management Power & Water Solutions, Inc., Pittsburgh, PA (US)

( * ) Notice: Subject to any disclaimer, the term of this patent is extended or adjusted under 35 U.S.C. 154(b) by 893 days.

(21) Appl. No.: 11/836,986

(22) Filed: Aug. 10, 2007

(65) Prior Publication Data

US 2009/0038304 A1 Feb. 12, 2009

(51) Int. Cl.
*F16K 11/10* (2006.01)
(52) U.S. Cl. ............... 137/884; 251/143; 251/149.6
(58) Field of Classification Search ........... 137/884; 251/143, 149.6
See application file for complete search history.

(56) References Cited

U.S. PATENT DOCUMENTS

| | | | |
|---|---|---|---|
| 2,524,052 A | 10/1950 | Grant | |
| 3,589,387 A * | 6/1971 | Raymond | 137/884 |
| 5,082,245 A | 1/1992 | Kast | |
| 5,086,803 A * | 2/1992 | Nakajima | 137/270 |
| 5,269,490 A | 12/1993 | Fujikawa et al. | |
| 5,860,445 A * | 1/1999 | Yoshimura et al. | 137/269 |
| 5,983,921 A * | 11/1999 | Miyazoe et al. | 137/269 |
| 6,102,062 A * | 8/2000 | Pearl et al. | 251/149.6 |
| 6,257,277 B1 | 7/2001 | McGeachy | |
| 6,382,589 B1 * | 5/2002 | Edstrom et al. | 251/149.6 |
| 6,405,815 B1 * | 6/2002 | Stoever et al. | 251/149.6 |
| 6,860,290 B2 | 3/2005 | Knuthson | |
| 6,871,576 B2 * | 3/2005 | Vari | 137/884 |
| 2006/0230755 A1 | 10/2006 | Natili et al. | |

FOREIGN PATENT DOCUMENTS

| | | |
|---|---|---|
| DE | 40 33 050 | 8/1991 |
| DE | 42 22 193 | 1/1993 |
| DE | 20 2007 001232 | 10/2006 |
| EP | 1357325 | 10/2003 |

(Continued)

OTHER PUBLICATIONS

Search Report for Application No. GB0814460.2, dated Dec. 5, 2008.

(Continued)

*Primary Examiner* — John Fox
(74) *Attorney, Agent, or Firm* — Marshall, Gerstein & Borun LLP

(57) ABSTRACT

An isolating manifold fluidly connected between a hydraulic valve and a hydraulic manifold operates to automatically isolate the valve from the hydraulic manifold as the valve is removed from the manifold, without requiring any particular blocking and bleeding procedures to be implemented on the valve or the manifold prior to the removal process. The isolating manifold includes an adaptor removably mounted onto a base with various pressure, control and tank fluid channels disposed in alignment through the adaptor and base portions to allow fluid to flow through each of the channels between the hydraulic manifold and the valve. During operation, the valve is mounted onto the adaptor while the base is mounted onto the hydraulic manifold. The valve may be removed from the hydraulic manifold by removing the adaptor from the base, during which process, the isolating manifold operates automatically to block the pressure and control ports of the hydraulic manifold and to bleed pressurized fluid from the pressure and control channels of the valve to a tank channel so as to automatically isolate the valve from the hydraulic manifold as the valve is removed from the hydraulic manifold.

43 Claims, 11 Drawing Sheets

FOREIGN PATENT DOCUMENTS

EP    1 878 958    7/2006

OTHER PUBLICATIONS

European Search Report for 08162092.4 dated Jul. 9, 2009.
Partial European Search Report for Application No. 08162092, dated Apr. 27, 2009.
Continental Hydraulics, "PowrFlow™ Directional Control Valves," Catalog Available at <URL: http://continentalhydraulics.brandspringsolutions.com/UserFiles/File/productPDF/DirCtrlVIv.pdf>.
Continental Hydraulics, "Wash Down Option Valves, Solenoid Actuated, Direct Operating," New VSD03M Available at <URL: http://www.continentalhydraulics.com/Wash_Down_D03_Cat_Supp.pdf>.
Daman Products Company, Inc., "Directional Valve Patterns."
Leechek, "Lee Presents Ø .187 Lo-Lohm Chek," (2002) Retrieved from the Internet on Oct. 26, 2005: URL:http://www.microhydraulics.com/VALVWEB2.NSF/4c8c908c6ad08610852563a9005dae17/0b9ed91b6... Internet site no longer active.

* cited by examiner

HYDRAULIC ISOLATING MANIFOLD

TECHNICAL FIELD

This patent relates generally to components used in hydraulic control systems and, in particular, to an isolating manifold used in a hydraulic actuated control system to automatically isolate a valve or other component from a hydraulic manifold during removal of the valve or other component from the hydraulic manifold.

BACKGROUND

Hydraulically actuated control systems are commonly used in many industries to control large mechanical equipment, and in one particular instance, are used to control power generation machines, such as turbines. Known hydraulically actuated control systems used in the power generation industry may, for example, include a hydraulically actuated trip control system or other protection system configured to stop the turbine (i.e., trip the turbine) upon the detection of an abnormal operating condition or other system malfunction. Typically, these hydraulically actuated control systems include a hydraulic manifold which has numerous different types of hydraulic lines or channels disposed therein, including a main pressure channel (which supplies pressured fluid from a high pressure fluid source), a tank channel (which returns hydraulic fluid to a reservoir or tank at low pressure), and one or more control channels which are used to control the operation of various different equipment, such as shut-off valves, etc. Generally speaking, various different control valves, such as electrically actuated control or solenoid valves, are mounted onto the control manifold at appropriate places to control the pressure and flow of hydraulic fluid within the various control lines of the manifold based on commands sent from a separately programmed controller. Such a hydraulically actuated control system for use in performing hydraulically actuated shut-downs within a steam operated turbine is disclosed in U.S. Patent Application Publication No. 2006/0230755-A1. However, many other and different types of hydraulic control systems are used to perform many different functions and operations in many different industries.

As will be understood, there can be many different numbers of and types of valves and other components attached to a hydraulic manifold used in a hydraulically actuated control system to perform various different functions with respect to controlling and delivering hydraulic fluid to various other devices within the plant or control system. While using these configurations is generally not a problem, it can sometimes be difficult to service known hydraulically actuated control systems, especially when such systems have a large number of valves or other components attached to a hydraulic manifold. In particular, to remove or replace a valve or other component attached to a hydraulic manifold of a hydraulically actuated control system, it is generally necessary to block the pressure lines going into the valve (to prevent the release of pressurized hydraulic fluid from the manifold during removal of the valve) and to then bleed the valve lines to remove existing high pressure conditions within the channels or ports of the valve. Only after blocking and bleeding the valve or other component, is it safe to begin to remove the valve or other component from the hydraulic manifold as removal of a valve or other component having highly pressurized fluid therein, or while this component is exposed to an unblocked high pressure line of the hydraulic manifold, can result in highly pressurized fluid squirting out of the valve or manifold during the removal process, which can result in high velocity fluid penetrating or cutting into objects or exposed skin, and can even cause the valve itself to be ejected away from the manifold at a high velocity. Both of these conditions result in serious safety hazards to personnel as well as a potential cause of damage to the control system hardware.

Thus, it is necessary, when servicing known hydraulic control systems, to first block and bleed a valve or other component to be serviced, prior to removing this component from the system. In many control systems, these blocking and bleeding operations may require halting the operation of the entire control system to remove pressure from the appropriate pressure channels going into or coming out of the valve to be serviced. In many instances, it is extremely undesirable and sometimes very expensive to halt the operation of the control system each time there is a need to perform service on some component of the system.

Some hydraulically actuated control systems are designed with specific components that enable a technician to block and bleed specific valves attached to the hydraulic manifold without shutting the control system down, i.e., to perform these operations while the manifold operates normally to provide fluid to other components of the system. However, in these control systems, it is necessary for the technician to manually initiate and implement separate block and bleed operations prior to removing the valve or other component to be serviced. In many cases, these block and bleed procedures are hard to implement or may be complex to perform, resulting in the possibility that the technician incorrectly performs these procedures. Thus, in many cases, the technician may fail to properly isolate the component being removed from the hydraulic manifold because of these difficulties. In other cases, the technician may simply forget to run the appropriate block and bleed procedures, or may think that he or she has run the appropriate procedures when they have, in fact, not done so. Still further, in these systems, it is difficult to tell, by looking at the outside of the hydraulic manifold, if the valve or other component to be serviced has been properly isolated from the manifold, and thus there is no easy way to determine if the appropriate block and bleed procedures have been performed for the component being removed or if, instead, the component is still exposed to a high pressure fluid line. Moreover, these systems require separately controllable valves (or other components) which are used to perform the blocking and bleeding operations on the components being serviced, which results in a large, complex design having separate parts that may be expensive to manufacture and hard to implement.

SUMMARY

An isolating manifold is fluidly connected between a component of a hydraulically actuated control system (such as a valve) and a hydraulic manifold of the control system and operates to automatically isolate the component from the hydraulic manifold as the component is removed from the manifold, without requiring any particular blocking and bleeding procedures to be run on the component or the manifold prior to the removal process. More particularly, an isolating manifold includes an adaptor removably mounted onto a base with various pressure, control and tank fluid channels disposed in alignment through the adaptor and base to allow fluid to flow through each of the various channels between the hydraulic manifold and a component mounted onto the adaptor. During operation, the valve or other component is mounted onto the adaptor of the isolating manifold while the base of the isolating manifold is mounted onto the hydraulic manifold. The valve or other component may be removed from the hydraulic manifold by removing the adaptor from the base. More particularly, as the adaptor of the isolating manifold is removed from the base of the isolating manifold, the isolating manifold automatically operates to block the pressure and control ports of the manifold and to then bleed pressurized fluid from the pressure and control channels of the valve or other component into a tank channel so as to automatically isolate the valve or other component from the hydraulic manifold as the valve is removed from the hydraulic manifold.

Thus, the isolating manifold described herein enables a valve or other component to be removed from a hydraulic manifold of a hydraulically actuated control system without requiring the control system to be shut down and without requiring the operator or technician to manually run block and bleed procedures with respect to the component being removed. This isolating manifold thereby provides for safe and efficient removal of a component from a hydraulic control manifold because the isolating manifold operates automatically to isolate the component (using the proper block and bleed procedures) from the fluid lines of the hydraulic control manifold as the component is removed from the hydraulic manifold. As a result, use of the isolating manifold described herein substantially reduces or eliminates the possibility of a technician or of other equipment being harmed by the release of highly pressured hydraulic fluid during the removal process. In a similar manner, use of the isolating manifold described herein allows a component, such as a valve, to be connected to a hydraulic control manifold while the hydraulic control manifold is in use, and without running any separate procedures on the component or the control manifold to enable the assembly to occur.

DETAILED DESCRIPTION

Electrically actuated, hydraulic control valves are used in many instances to control the operation of various different types of devices, such as shut-down valves, turbines or other hydraulically controlled devices within a plant environment. Such control valves, for example, are commonly used in power generating plants, processing plants, manufacturing and automated plants. In such uses, the electrically actuated, hydraulic control valves are generally electrically connected to a controller, which causes the valves to actuate to control the flow of hydraulic fluid within one or more hydraulic lines, to thereby control the operation of a further device, such as a turbine, a valve or other device connected to the hydraulic fluid line within the plant. The electrically actuated, hydraulic control valves, which may be solenoid valves or other hydraulic manifold mounted valves, are generally mechanically and fluidly connected to a hydraulic control manifold, which is designed to conduct hydraulic fluid under pressure between the control valves and other devices and to perform a specific operation within the plant using the pressurized hydraulic fluid. Such control manifolds can be quite complex and typically have one or more hydraulic supply and/or return channels disposed therein, as well as various pressure and control channels for connection to numerous control valves which control the flow of fluid through the hydraulic manifold.

Figure 1:
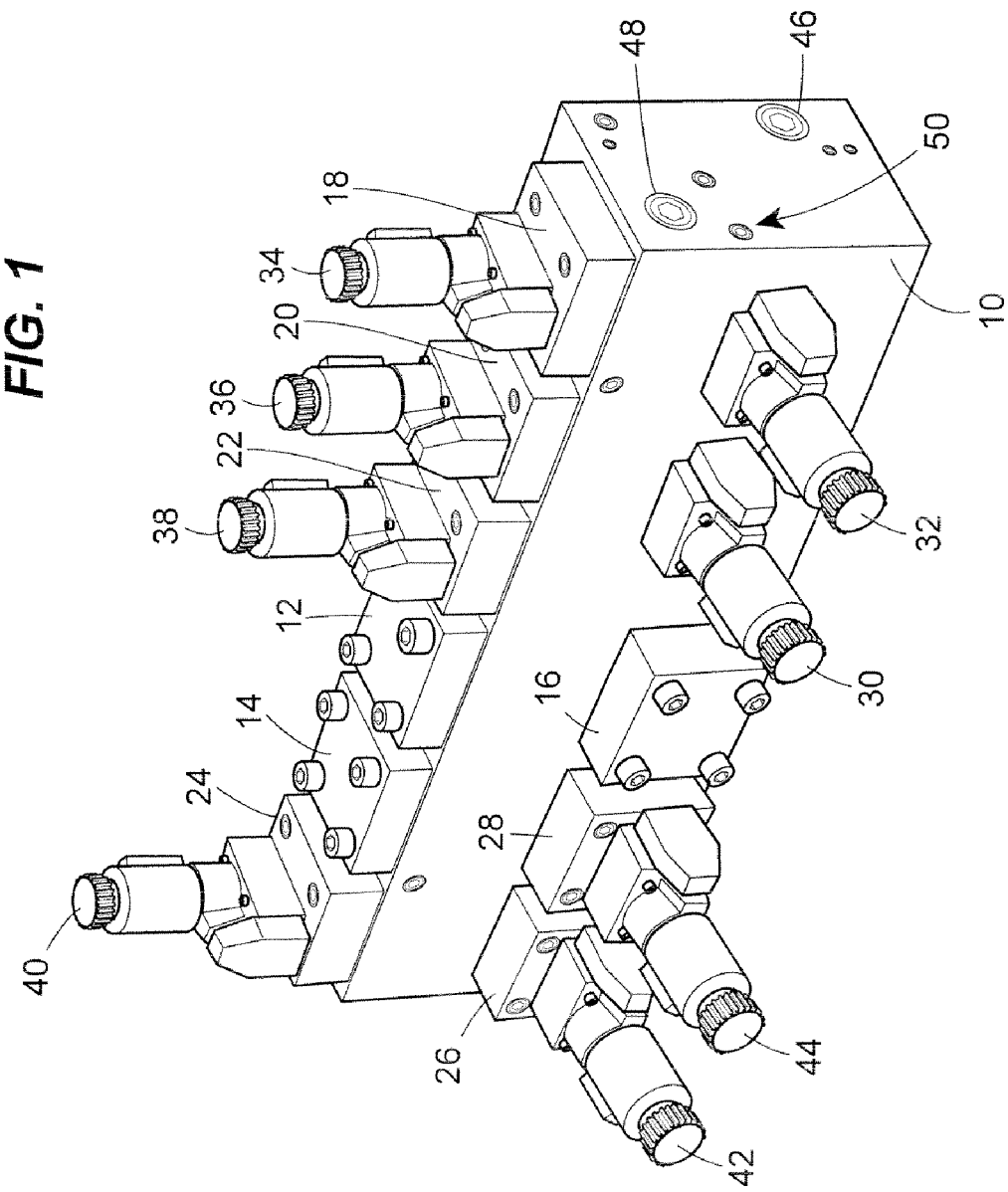
FIG. 1 is a three-dimensional perspective view of a typical hydraulic control manifold including various cover plates, mounting hardware, and valves.

FIG. 1, for example, provides a three-dimensional perspective view of a hydraulic control manifold 10, which includes various cover plates 12, 14, 16, mounting hardware 18-28, and control valves 30-44 removably mounted thereto, wherein the control valves 30-44 are configured to be in various types of fluid communication with a pressure channel 46, a return or tank channel 48, and a bleed or control channel 50 disposed within the manifold 10, as well as other channels not shown in FIG. 1. Of course, the control manifold 10 may be designed to perform any desired hydraulic operation. However, generally speaking, the hydraulic control manifold 10 operates as a fluid distribution device having one or more portals, passages, channels and/or chambers therein and is designed to transfer hydraulic fluid between the various components of an operating hydraulic system, such as valve(s), bleed tank(s), and turbine(s). U.S. Patent Application Publication No. 2006/0230755-A1, the disclosure of which is hereby expressly incorporated by reference herein, describes a hydraulic control manifold such as that of FIG. 1 for use in performing hydraulic actuated shut-downs (including blocking and bleeding functions) within a steam operated turbine. Of course, the configuration of a hydraulic control manifold 10 is not limited to that described in U.S. Patent Application Publication No. 2006/0230755-A1, but may take on any other desired configuration.

As will be understood, the solenoid valves 30-44 are connected to the control manifold 10 directly or through the mounting hardware 18-28 (sometimes called mounting cartridges) using threaded bolts that enable the valves 30-44 to be attached to and removed from the hydraulic control manifold 10 (although other attachment structure could be used as well or instead). However, problems may arise when attaching or removing the valves 30-44 to or from the control manifold 10 (either directly or with the use of typical mounting hardware 18-28) due to the presence of pressured hydraulic fluid within the control manifold 10. For example, attempting to remove a valve (e.g., the valve 30) from the control manifold 10 when the valve 30 is still communicatively connected to a pressured hydraulic line within the control manifold 10 may be dangerous and may result in injury to the technician, damage to the equipment or both. In particular, removing a valve while one of the ports of the valve is exposed to a pressurized fluid line within the control manifold 10 can result in highly pressurized hydraulic fluid squirting out of the control manifold 10 at high rates of speed, which may be harmful to the technician and/or which may damage the control manifold 10, the valve being removed and/or other equipment near the control manifold 10. Likewise, as the bolts holding the valve are completely loosened, the pressurized fluid may provide enough force to eject the valve away from the manifold 10, which can be extremely dangerous. Thus, it is typically necessary to block and bleed the hydraulic fluid lines within the control manifold 10 that are coupled to a valve being removed to assure safe removal of the valve. While such blocking and bleeding procedures are usually well established, these procedures may be hard or inconvenient to implement and, in some cases, the technician may simply forget to implement these procedures, resulting in unsafe conditions.

To eliminate or reduce these safety concerns and to make removal of a valve or other component from a hydraulic control manifold easier, an isolating manifold, as described in more detail herein, is disposed between a valve or other hydraulic component and a hydraulic manifold (also referred to as a hydraulic component). The isolating manifold operates to automatically hydraulically isolate the valve from the hydraulic control manifold as the valve is removed from the hydraulic control manifold, thereby eliminating or reducing the need for other traditional removal methods which require manually blocking and bleeding of the fluid lines within the control manifold prior to removing the valve.

Figure 2:
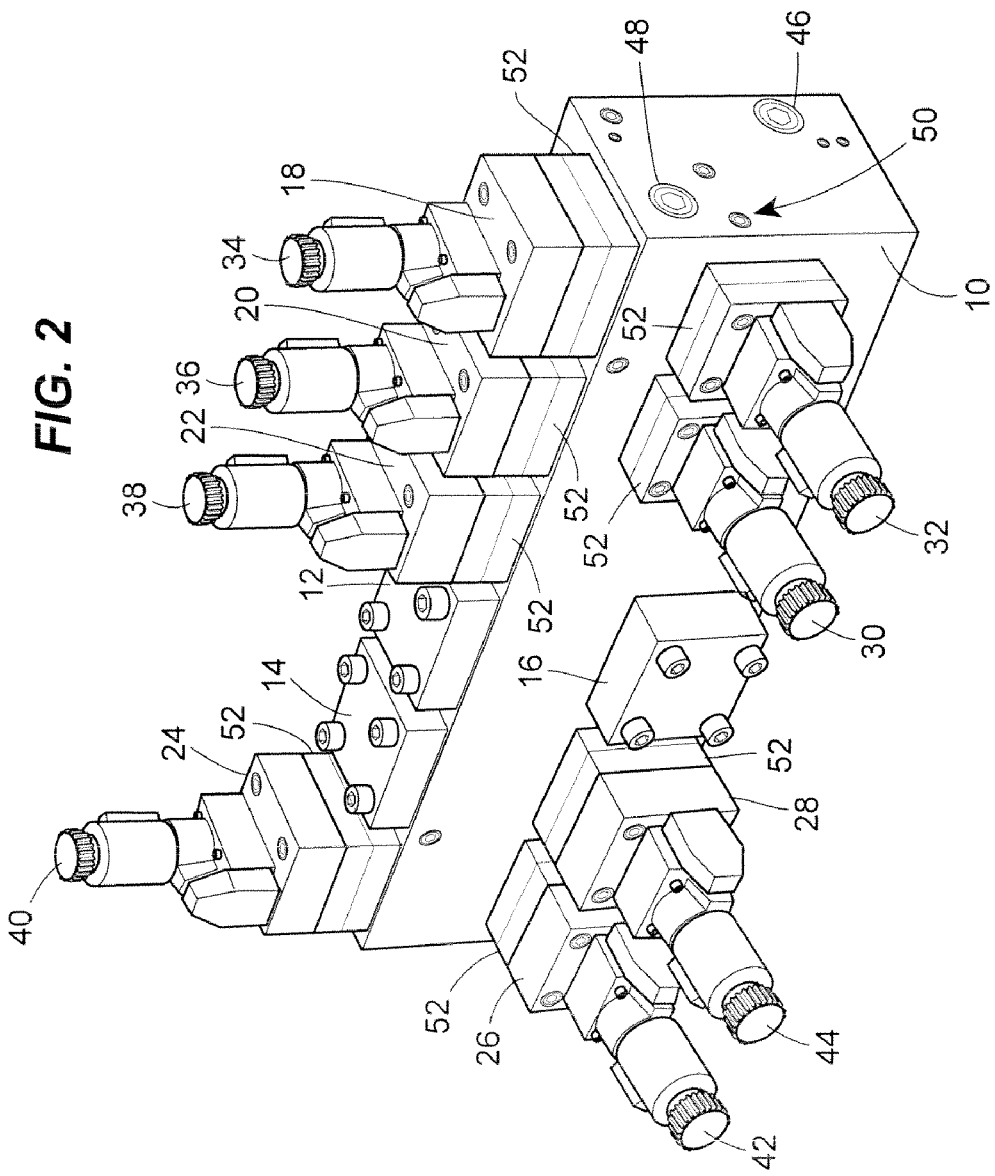
FIG. 2 is a three-dimensional perspective view of a hydraulic control manifold similar to the one shown in FIG. 1 but including various hydraulic isolating manifolds mounted thereon.

Examples of the use of such an isolating manifold are illustrated in FIG. 2, which provides a three-dimensional perspective view of the hydraulic manifold 10 shown in FIG. 1 in which each of the valves 30-44 and associated mounting hardware 18-28 is mounted onto the hydraulic manifold 10 through an isolating manifold 52. In particular, FIG. 2 illustrates the valve 34 and mounting hardware 18 as being mounted onto a hydraulic isolating manifold 52, which is mounted onto the hydraulic manifold 10. Similarly, the other valves 30-32 and 36-44 are mounted either directly or through mounting hardware (which are considered to be hydraulic components) onto respective hydraulic isolating manifolds 52 which are, in turn, mounted directly to the hydraulic manifold 10. (If desired, one or more of the hydraulic isolating manifolds 52 could be connected to other mounting hardware which then connects to the hydraulic control manifold 10, but in this case, this other mounting hardware is considered to be part of the hydraulic control manifold 10. In other words, the hydraulic isolating manifolds 52 may be connected or mounted directly or indirectly to the main body of the control manifold 10). Generally speaking, each of the hydraulic isolating manifolds 52 is designed to provide for safe and convenient removal of a valve 30-44 from, and easy installation of a valve 30-44, onto an operating hydraulic manifold 10, without the need to suspend or cease operation of the hydraulic manifold 10 or to manually block and bleed hydraulic lines within the hydraulic manifold 10 using separate procedures. As a result, use of the isolating manifolds 52 makes installation and removal of the valves 30-44 easier, more convenient and safer.

Figure 3:
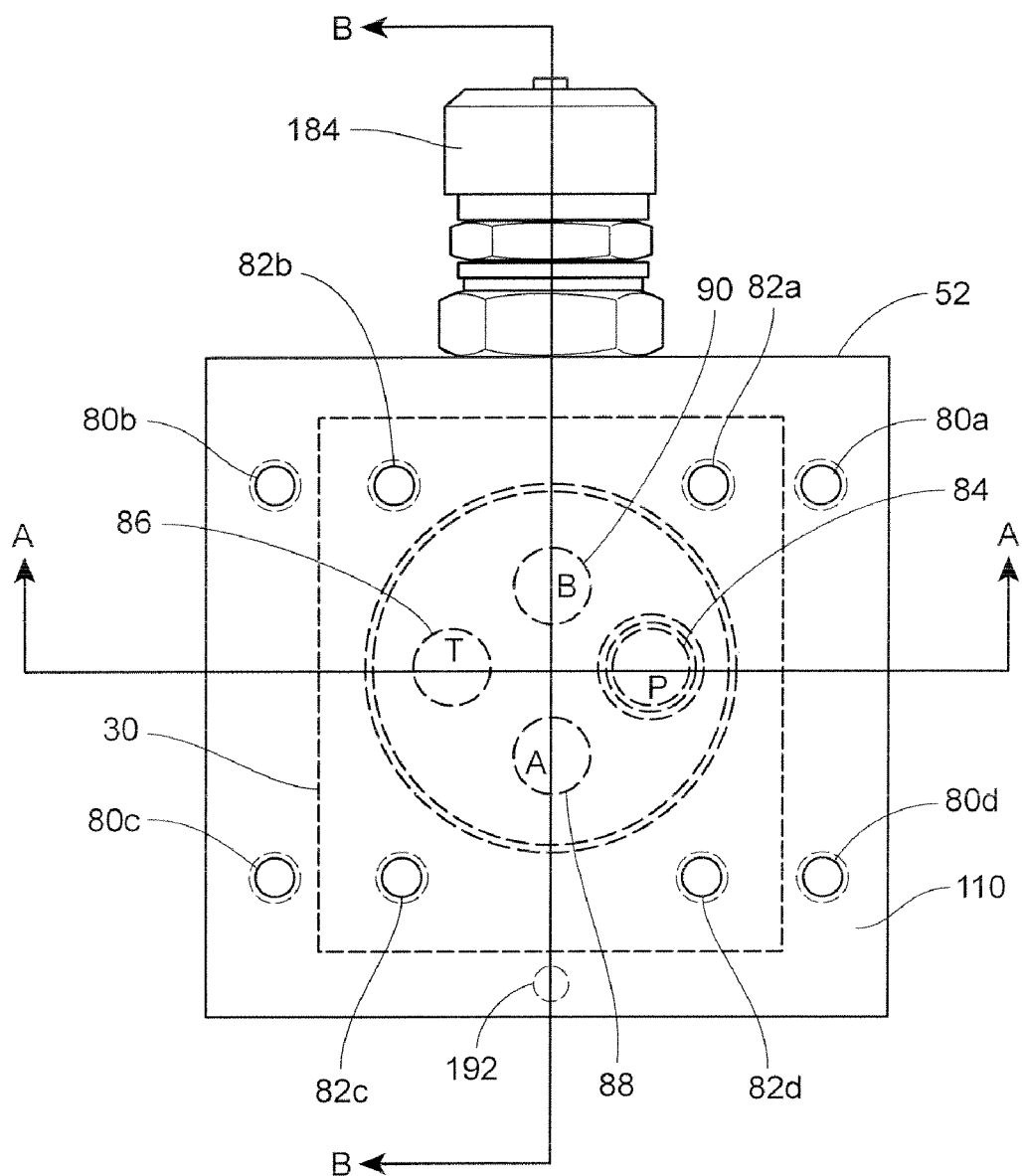
FIG. 3 is a top plan view of a valve installed onto one of the isolating manifolds illustrated in FIG. 2.
Figure 4A:
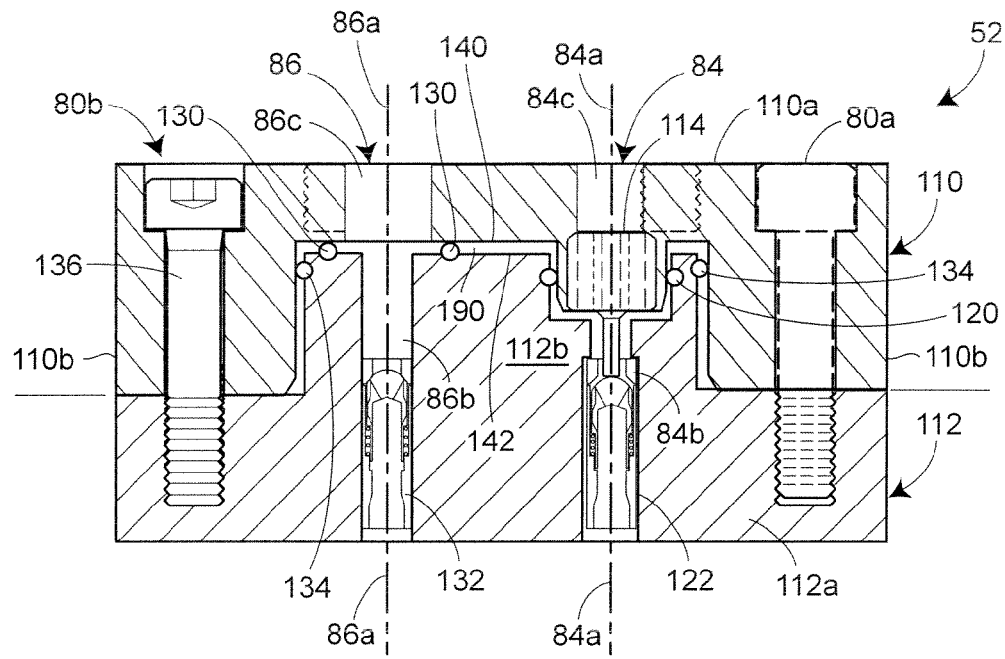
FIG. 4A is a view along sectioning line A-A of FIG. 3 illustrating a sectional side view of an isolating manifold of FIG. 2.
Figure 4B:
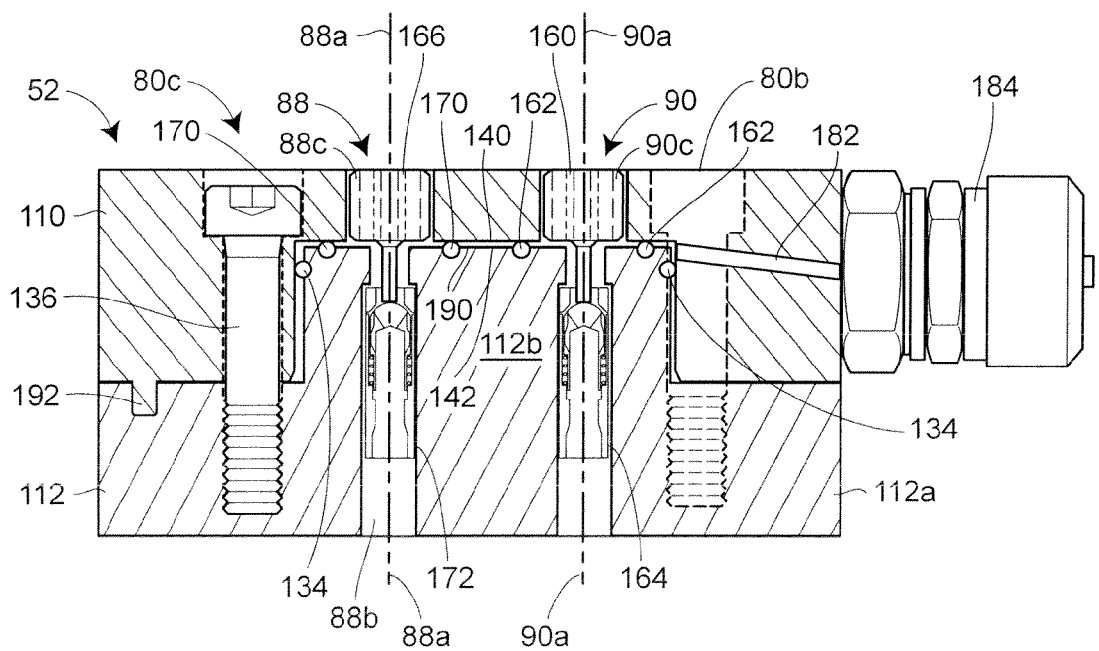
FIG. 4B is a view along sectioning line B-B of FIG. 3 illustrating a further sectional side view of an isolating manifold of FIG. 2.

FIG. 3 illustrates a top view of the valve 30 of FIG. 1 mounted onto one of the hydraulic isolating manifolds 52. Sectioning lines A-A and B-B are noted and their respective views are further illustrated in FIG. 4 and FIGS. 6-11. As best shown in FIG. 4 (including FIGS. 4A and 4B), each hydraulic isolating manifold 52 generally includes two manifold members generally referred to herein as an adaptor 110 and a base 112. The adaptor 110 is removably mounted onto the base 112, wherein during operation, a valve (such as the valve 30) is mounted onto the adaptor 110 while the base 112 is mounted onto the control manifold 10 (FIG. 2). Referring again to FIG. 3, a series of adaptor-to-base mounting holes 80a-80d are shown, without corresponding mounting bolts installed, which together are used to secure or attach the two manifold members of the hydraulic isolating manifold 52 (i.e., the adaptor 110 and the base 112) to one another in various different mounting positions including a fully mounted position and a plurality of partially mounted positions. The base 112 is attached to the control manifold 110 via a separate set of bolts not shown in FIG. 3. Similarly, a series of valve-to-adaptor mounting holes 82a-82d are shown in FIG. 3, again without corresponding mounting bolts installed, which together are used to mount the valve 30 onto the adaptor 110 of the hydraulic isolating manifold 52. The bolts disposed in the holes 82a-82d do not extend down into the base 112. Generally speaking the mounting holes 80a-80d and 82a-82d (and if preferred the threaded bolts which cooperate with these holes) make up connection structure for connecting the valve to the adaptor (i.e., the first manifold member) and for connecting the adaptor to the base. Moreover the operation of connecting and disconnecting the threaded bolts through the holes 80a-80d (which may have threaded ends adapted to accept or cooperate with threaded ends of the bolts) enables a user to move the first and second manifold members with respect to one another between a fully mounted position and an unmounted position, with a plurality of partially mounted positions therebetween.

FIG. 3 also illustrates hidden views of a pressure port 84, a tank port 86, an A control port 88, and a B control port 90. The ports 84, 86, 88 and 90 are present at the interface between the hydraulic isolating manifold 52 and the valve 30 and are used to align pressure channels, tank channels, and control channels within the valve 30 with corresponding fluid channels in the isolating manifold 52 to enable hydraulic fluid to flow between the valve 30 and the isolating manifold 52 through the ports 84, 86, 88 and 90. Moreover, a similar set of ports are present at the interface between the isolating manifold 52 and the hydraulic manifold 10 and are used to align pressure channels, tank channels, and control channels within hydraulic manifold 10 with the corresponding fluid channels in the isolating manifold 52 to enable hydraulic fluid to flow between the hydraulic manifold 10 and the isolating manifold 52. The diamond shaped pattern of the four ports 84, 86, 88 and 90 (as illustrated in hidden view in FIG. 3) is commonly known in the industry as Directional Valve Pattern D03, and the embodiment of the hydraulic isolating manifold 52 illustrated in FIGS. 3, 4 and 6-11 is designed to be used with valves or other devices that have a port configuration that conforms with the specifications of the D03 valve port configuration. Of course, other embodiments of the hydraulic isolating manifold 52 may include different directional valve patterns, in accordance with different valve port specifications or configurations. For example, the isolating manifold described herein may be used with or include any of the patterns associated with the NFPA T3.5.1M R1-1984 and ANSI B93.7M-1986 Standards, which are the two standards that govern subplate mounting surfaces (with directional valve patterns being one type of subplate mounting surface). The directional valve patterns of these standards include, for example, the D02, D03, D05, D06, D07, D08 and D10 patterns. Servo valves are a special type of directional control valve which also may be a candidate for the isolating manifold described herein. There has been some standardization of servo valve patterns, which are covered under the ISO 10372 standards, but there are many manufacturer specific patterns from companies such as Moog (which also includes Atchley and Pegasus), Rexroth, Vickers Parker and HR Textron which could be used. There are also other directional valves that have manufacturer specific mounting patterns which are considered obsolete, but that are still encountered in the industry and which would be candidates for the isolating manifold described herein. These patterns include those made by Denison (patterns D1D04, D1D24, D1D12), Vickers (patterns D1L, DG4M4, DG4S4, DD063), Racine (patterns 01Q and 01S), Parker (pattern D1B) and Republic (pattern R8143). It will be understood however, that the patterns listed above are merely a sample of the existing patterns with which the isolating manifold described herein may be used and that other patterns may exist or may be developed in the future.

FIG. 4A illustrates a cross-sectional view of the hydraulic isolating manifold 52 along the sectioning line A-A of FIG. 3, showing the adaptor 110 fully mounted onto the base 112 and more particularly illustrating the configuration of the isolating manifold 52 with respect to the operation of the pressure port 84 and the tank port 86 when the adaptor 110 and the base 112 are mounted together in the fully mounted position. While the adaptor-to-base mounting holes 80a and 80b are illustrated in this view, these holes are indicated in dotted line relief illustrating that they would not be viewable from this cross-sectional view of the isolating manifold 52. Moreover, these holes are indicated as including threaded ends within the base 112. FIG. 4A also illustrates the center lines 84a and 86a of the pressure port 84 and the tank port 86, and these center lines 84a and 86a align with a pressure channel and a tank channel. In particular, a pressure channel 84b is disposed in and extends through the base 112 to align with a pressure channel 84c which is disposed in and extends through the adaptor 110. Likewise, a tank channel 86b is disposed in and extends through the base 112 and aligns with a tank channel 86c which is disposed in and extends through the adaptor 110. Generally speaking, the base 112 includes a lower portion 112a having with a raised middle portion 112b extending therefrom. The adaptor 110, on the other hand, includes a continuous upper portion 110a with raised edges 110b at the outer edges thereof to form a reduced in thickness center of the adaptor 110 (also referred to as a recessed portion), with the recessed center portion of the adaptor 110 fitting over the raised middle portion 112b of the base 112. As a result, the adaptor 110 generally appears, in cross section, like an inverted U. As illustrated in FIG. 4A, the pressure channel 84b and the tank channel 86b extend through the lower portion 112a and the raised middle portion 112b of the base 112 and mate with the corresponding pressure channel 84c and tank channel 86c extending through the recessed portion of the adapter 110.

A push-pin fitting 114, which operates as an actuator member, is disposed in an extended portion of the recessed portion of the adaptor 110 through which the pressure channel 84c flows. An associated O-ring 120 is disposed around the extended portion of the recessed portion of the adaptor 110 forming the pressure channel 84c and, along with the push-pin fitting 114, is aligned along the center line 84a of the pressure channel 84. The O-ring 120 operates to seal the gap created between the extended portion of the recessed center portion of the adaptor 110 and a depressed portion of the raised middle portion of the base 112b into which the extended portion of the recessed center portion of the adaptor 110 fits when the adaptor 110 and the base 112 are mounted together in the fully mounted position. A spring biased check valve assembly 122 is disposed in the pressure channel 84b within the base 112 as illustrated in FIG. 4A and interacts with or cooperates with the push-pin fitting 114 to allow (in some instances) or to block (in other instances) fluid flow from the hydraulic manifold 10 to the adaptor 110 in a manner described in more detail below.

Figure 5A:
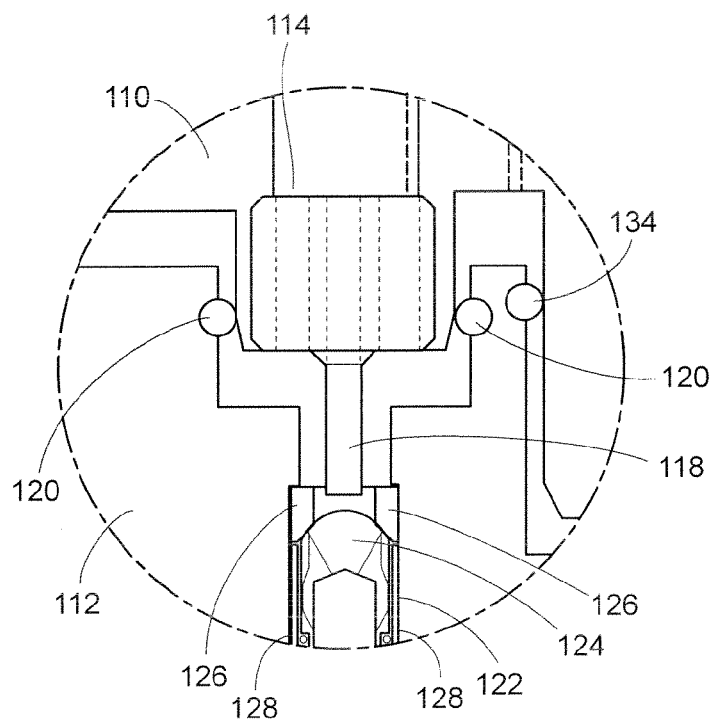
FIG. 5A is a close-up view of a push-pin fitting disposed in a pressure channel of the hydraulic isolating manifold of FIG. 2, with a push-pin close to but not engaging a ball of a spring-loaded check valve assembly biased in a closed position.
Figure 5B:
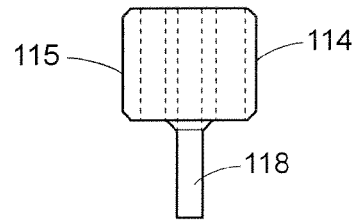
FIG. 5B is a side view of the push-pin fitting of FIG. 5A, illustrating the flow-design through design (hidden lines) of the push-pin fitting of FIG. 5A.
Figure 5C:
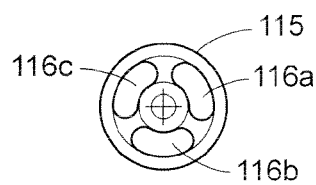
FIG. 5C is a top view of the push-pin fitting of FIG. 5A, illustrating the flow-through design of the push-pin fitting of FIG. 5A.
Figure 5E:
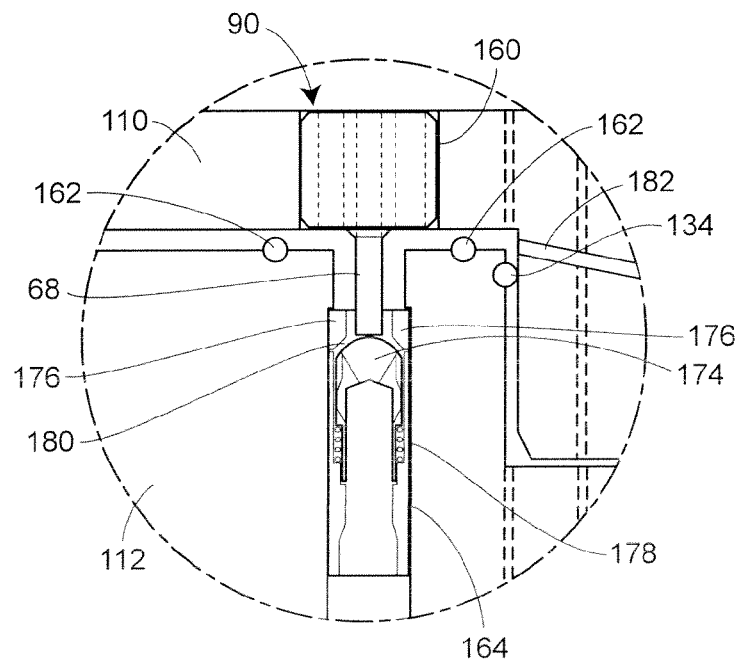
FIG. 5E is a close-up view of a push-pin and check valve assembly disposed in a control channel of a hydraulic isolating manifold of FIG. 2, with the push-pin engaging a ball of a spring-loaded check valve assembly to force the check valve assembly into an open position against the bias of a spring.
Figure 5D:
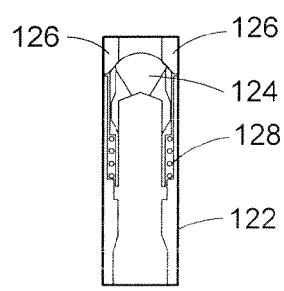
FIG. 5D is a cross-sectional side view of the check valve assembly included within a pressure channel of a hydraulic isolating manifold of FIG. 2.

Close-up views of the push-pin fitting 114 and the check valve assembly 122 are illustrated in FIGS. 5A-5D. As best illustrated in FIGS. 5B and 5C, the push-pin fitting 114 includes a head 115 having an outer wall and a series of open passages 116a-116c disposed within an interior of the outer wall forming passages through the head 115. A push-pin 118 is connected to the head 115 as shown in FIG. 5B. The passages 116 allow hydraulic fluid to pass through the push-pin head 115 and thus through the push-pin fitting 114. FIGS. 5A and 5D illustrate the check valve assembly 122 as including a ball 124 forced into a closed position against a seat 126 by a spring 128 which is, in turn, seated in an internal wall of the check valve housing. During operation, when the adaptor 110 is fully mounted onto the base 112, the push-pin 118 of the push-pin fitting 114 presses against the ball 124 of the check valve assembly 122 acting against the force of the spring 128 to force the ball 124 away from the seat 126, thereby allowing hydraulic fluid to pass through the check valve assembly 122 towards the adaptor 110. The fluid then flows through the passages 116 of push-pin fitting 114 and in this manner flows between the pressure channels 84*b* and 84*c*. On the other hand, as best illustrated in FIG. 5A, when the adaptor 110 is removed from the base, the push-pin 118 moves away from the ball 124, until the spring 128 of the check valve assembly 122 forces the ball 124 into contact with the seat 126 of the check valve assembly 122, thereby blocking the pressure channel 84*b* and preventing fluid flow between the pressure channels 84*b* and 84*c*.

Referring again to FIG. 4A, a non-biased check valve assembly 132 is disposed within the tank channel 86*b* of the base 112 and is aligned along the center line 86*a* of the tank port 86. The non-biased check valve assembly 132 is similar to the check valve assembly 122 of FIG. 5D, except that the check valve assembly 132 does not include a spring 128 and thus operates to allow flow from the tank channel 86*c* toward the base 112 whenever the fluid pressure on the top of the check valve assembly 132 (i.e., on the adaptor side of the check valve assembly 132) is greater than the fluid pressure below the check valve assembly 132 (i.e., on the hydraulic manifold side of the check valve assembly 132). Thus, the check valve assembly 132 allows fluid to flow therethrough from a valve (mounted on the adaptor 110) to a tank, which is a fluid reservoir typically at atmospheric pressure, that is connected to the tank channel 86*b* through the control manifold 10 of FIG. 2. The check valve assembly 132 enables fluid flow in one direction only, as fluid pressure exerted in the other direction, i.e. from the tank towards the tank channel 86*c* will force the ball of the check valve assembly 132 onto a seat, thereby preventing fluid flow. In other words, because the check valve assembly 132 does not include a spring biasing the ball thereof against a seat the check valve assembly 132 will always allow fluid flow into the tank from the valve fluidly coupled to the tank channel 86*c* but will not allow fluid flow back from the tank to the valve disposed on the adaptor 110.

As illustrated in FIG. 4A, an O-ring 130 is disposed between the raised middle portion of the base 112*b* and the recessed portion of the adaptor 110, and is centered around the tank channel center line 86*a*. Moreover, a larger O-ring 134 is disposed around the raised middle portion of the base 112*b* and operates as a seal between the edges 110*a* of the adaptor 110 and the raised middle portion of the base 112*b*. The O-ring 134 allows a cavity 190 partially formed by a surface 140 of the adaptor 110 and a surface 142 of the base 112 to remain hydraulically sealed from the exterior of the isolating manifold 52 after these surfaces move apart from one another (up to about 0.38 inches apart in one example) and after the individual O-rings 120 and 130 lose their sealing effectiveness. The sequential functioning of the O-rings 120, 130 and 134, the check valves assemblies 122 and 132 and the push-pin fitting 114, as the adaptor 110 and the base 112 of the isolating manifold 52 are disassembled (and assembled), will be discussed in detail below. FIG. 4A also shows a mounting bolt 136 having a threaded ends which is one of several such bolts placed into the adaptor-to-base mounting holes 80, used for mounting the adaptor 110 to the base 112.

FIG. 4B illustrates a view along the sectioning line B-B of the hydraulic isolating manifold 52 to illustrate the configuration of the isolating manifold 52 with respect to the A and B control ports 88 and 90. In this view, adaptor-to-base mounting holes 80*c* and 80*b* are also shown in dotted relief, illustrating that these holes would not normally be visible in the cut-away view of FIG. 4B. Center lines 88*a* and 90*a* associated with the A control port 88 and the B control port 90, respectively, are illustrated and these center lines 88*a* and 90*a* align with an A control channel and a B control channel, respectively. In particular, an A control channel 88*b* is disposed in and extends through the base 112 and aligns with an A control channel 88*c* which is disposed in and extends through the adaptor 110. Likewise, a B control channel 90*b* is disposed in and extends through the base 112 and aligns with a B control channel 90*c* which is disposed in and extends through the adaptor 110.

As illustrated in FIG. 4B, a push-pin fitting 160 is disposed within the B control channel 90*c* and is aligned along the center line 90*a* of the B control port 90 while an associated O-ring 162 provides a seal around the B control channel 90*b* and 90*c* at the junction of the base 112 and the adaptor 110. Additionally, a spring biased check valve assembly 164 is mounted within the B control channel 90*b* within the base 112. In a similar manner, a push-pin fitting 166 is disposed within the A control channel 88*c* and is aligned along the center line 88*a* of the A control port 88 while an associated O-ring 170 provides a seal around the A control channel 88*b* and 88*c* at the junction of the base 112 and the adaptor 110. Additionally, a spring biased check valve assembly 172 is mounted within the A control channel 88*b* within the base 112. In the same manner as shown in FIG. 4A, the O-ring 134 provides a seal between the adaptor 110 and the base 112 around the outer edges of the raised middle portion of the base 112*b* to seal the cavity 190.

A close-up view of the B control channel 90 is illustrated in FIG. 5E. In this view, the push-pin fitting 160 (which may be the same as the fitting 114 of FIGS. 5B and 5C) includes a push-pin 168 while the check valve assembly 164 includes a ball 174, a seat 176, and a spring 178. When the push-pin 168 contacts the ball 174, the push-pin 168 pushes against the force of the spring 178, and moves the ball 174 away from the seat 176, thus creating a passage 180, through which hydraulic fluid may flow past the check valve assembly 164.

Referring again to FIG. 4B, a pressure take-off channel 182 is disposed in the adaptor 110 and extends through the adaptor edge walls 110*b* from an area just above the O-ring 134 to a pressure take-off fitting 184 (not shown in cross-sectional view), which is mounted on the exterior of the adaptor 110. The pressure take-off fitting 184 may be any standard or known type of fitting that accepts a pressure gauge to be attached to the pressure take-off fitting 184 and may be used to measure the pressure existing in the area between the raised middle portion of the base 112*a* and the recessed portion of the adaptor 110.

FIGS. 6-11 illustrate the operation of the hydraulic isolating manifold 52 during the disassembly of the adaptor 110 from the base 112, i.e., as the adaptor 10 of the hydraulic isolating manifold 52 (to which the valve 30 of FIG. 2 is attached) is removed from the base 112 of the hydraulic isolating manifold 52 (which is attached to the control manifold 10 of FIG. 2). The embodiment of the hydraulic isolating manifold 52 illustrated in FIGS. 6-11 includes four check valve assemblies 122, 132, 164, 172 mounted in the base 112 and arranged in a diamond-shaped pattern (as seen from above) known in the industry as Directional Valve Pattern D03. Each of FIGS. 6-11, shows two views of the hydraulic isolating manifold 52, one along sectioning lines A-A (FIGS. 6A-11A), and the other along sectioning lines B-B (FIGS.

6B-11B) so as to illustrate the operation of each of the four ports 84, 86, 88 and 90 and associated fluid channels during disassembly of the isolating manifold 52. The check valve assemblies 122, 164, 172 are spring-loaded and biased in the closed position and their balls 124, 186, 174 are forced open by the push-pins 118, 188, 168 of the push-pin fittings 114, 160, 166 respectively. The check valve assembly 132 in the tank channel 86*b* does not have a spring and so the check valve assembly 132 allows free flow of fluid in one direction (toward the base 112 and into the tank, not shown) without the need for a push-pin.

Figure 6A:
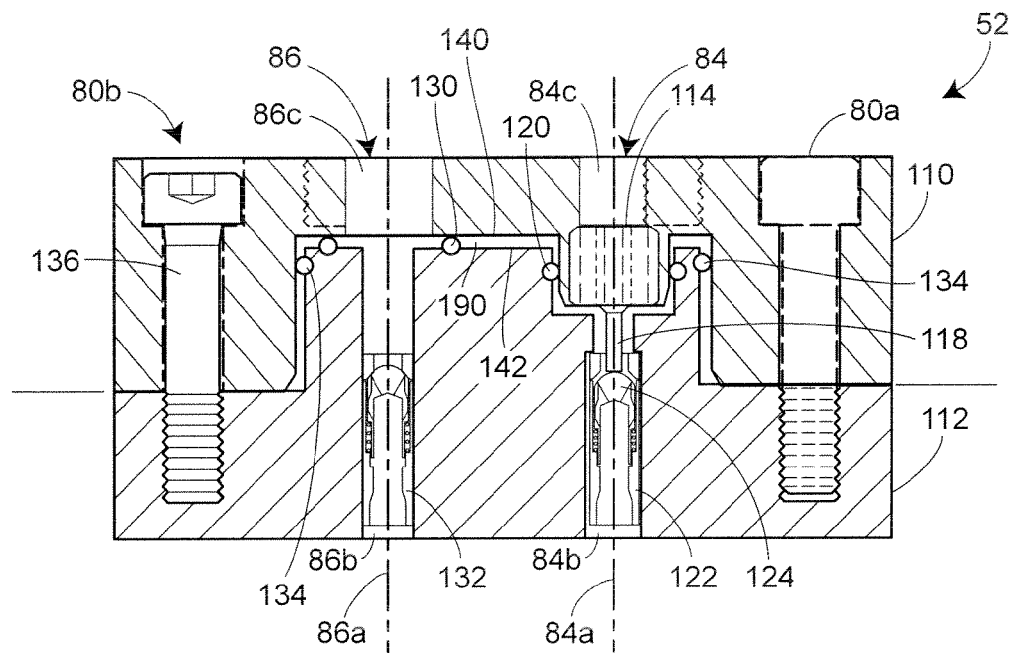
FIG. 6A is a view along sectioning line A-A of a hydraulic isolating manifold of FIG. 2, showing the beginning of the process of disassembling an adaptor of the hydraulic isolating manifold from a base of the hydraulic isolating manifold.
Figure 6B:
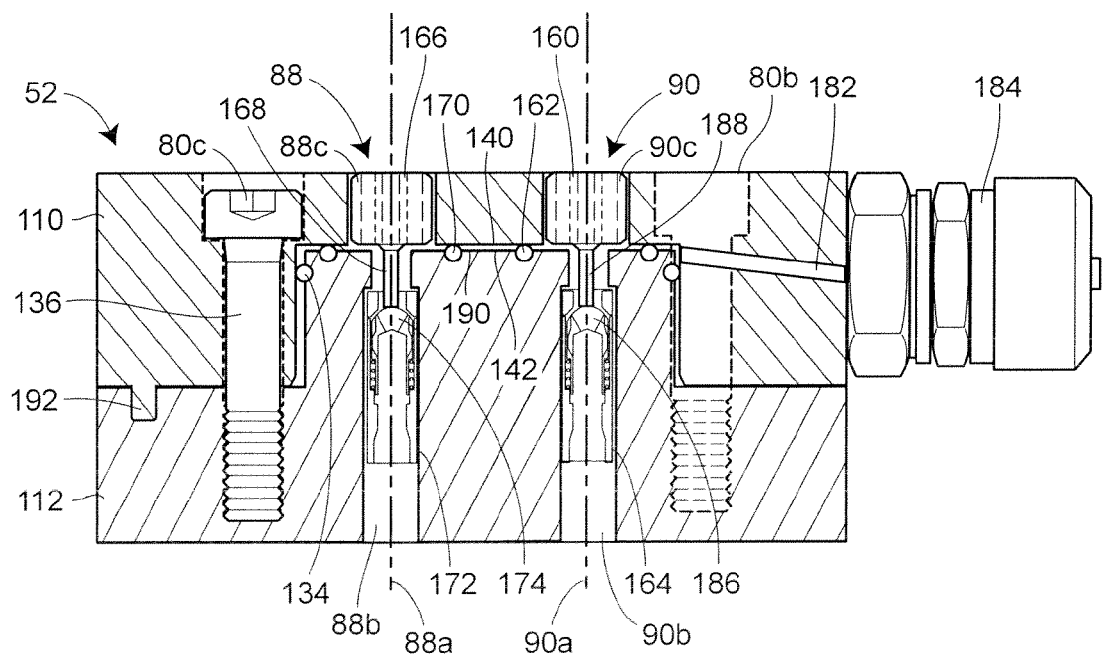
FIG. 6B is a view along sectioning line B-B of a hydraulic isolating manifold of FIG. 2, showing the beginning of the process of disassembling the adaptor of the hydraulic isolating manifold from the base of the hydraulic isolating manifold.

In the configuration illustrated in FIGS. 6A and 6B, the adaptor 110 is fully mounted onto and is connected to the base 112 by bolts within the bolt holes 80, and hence the distance between the adaptor 110 and the base 112 (viewed from the exterior of the isolating manifold 52) is approximately zero inches. As will be understood, this gap will change during the disassembly progression as the walls 140 and 142 move away from one another. In FIGS. 6A and 6B, the check valve assembly 122 within the pressure channel 84*b*, the check valve assembly 164 within the B control channel 90*b*, and the check valve assembly 172 within the A control channel 88*b* all have their respective balls 124, 186, 174 forced into the open position by a respective push-pin 118, 188, 168 and so each of the ports 84, 90 and 88 is fluidly connected to the control manifold 10. The check valve assembly 132 in the tank channel 86*b* allows free flow of fluid between the valve 30 (not shown in FIGS. 6A and 6B) attached to the adaptor 110 and the control manifold 10 in one direction without the use of a push-pin. Moreover, each of the ports 84, 86, 88 and 90 is individually isolated with respect to one another via the cavity 190 by the respective O-rings 120, 130, 170, 162 residing between the adaptor 110 and the base 112. Moreover, the entire cavity 190 between the raised middle portion 112*b* of the base 112 and the recessed portion of the adaptor 110 is further isolated from the exterior of the isolating manifold 52 by the larger O-ring 134. Thus, in the configuration of FIGS. 6A and 6B, fluid can freely flow through the isolating manifold 52 between a valve (which is connected to the adaptor 110) and the control manifold 10 (which is connected to the base 112) with respect to each of the ports 84, 86, 88 and 90.

As will be understood, a hydraulic valve which is mounted onto the adaptor 110 of the isolating manifold 52 may be safely disconnected from and removed from the control manifold 10 (both physically and fluidly) by simply removing the adaptor 110 from the base 112 by removing the bolts in the adaptor-to-base mounting holes 80, during which process the adaptor 110 and base 112 will move from the fully mounted position (of FIG. 6), through various partially mounted positions (some of which are illustrated in FIGS. 7-10), to an unmounted position (FIG. 11). The isolating manifold 52 is configured in such a manner that the isolating manifold 52 automatically blocks and bleeds the ports 84, 88 and 90 of the valve attached to the adaptor 110 regardless of whether such blocking and bleeding functions have been performed using other devices or procedures within the control manifold 10. Thus, using the isolating manifold 52, a valve may be safely removed from the control manifold 10 even if fluid is being actively provided to the valve through the pressure port 84 and the valve is fluidly connected to other portions of the control manifold 10 via the A control port 88 and the B control port 90 at the beginning of the removal process because the isolating manifold 52 operates to isolate each of the ports of the valve from the control manifold 10 as the adaptor 110 of the isolating manifold 52 is removed from the base 112 of the isolating manifold.

Figure 7A:
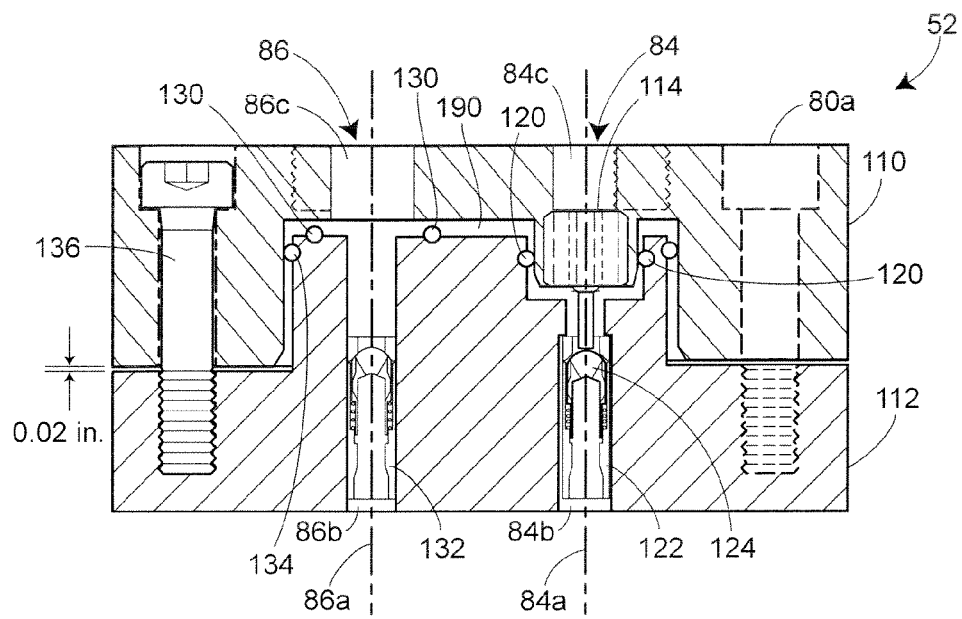
FIG. 7A is a view along sectioning line A-A of a hydraulic isolating manifold of FIG. 2, showing the disassembly of the adaptor from the base, with a gap opened between them of about 0.02 inches.
Figure 7B:
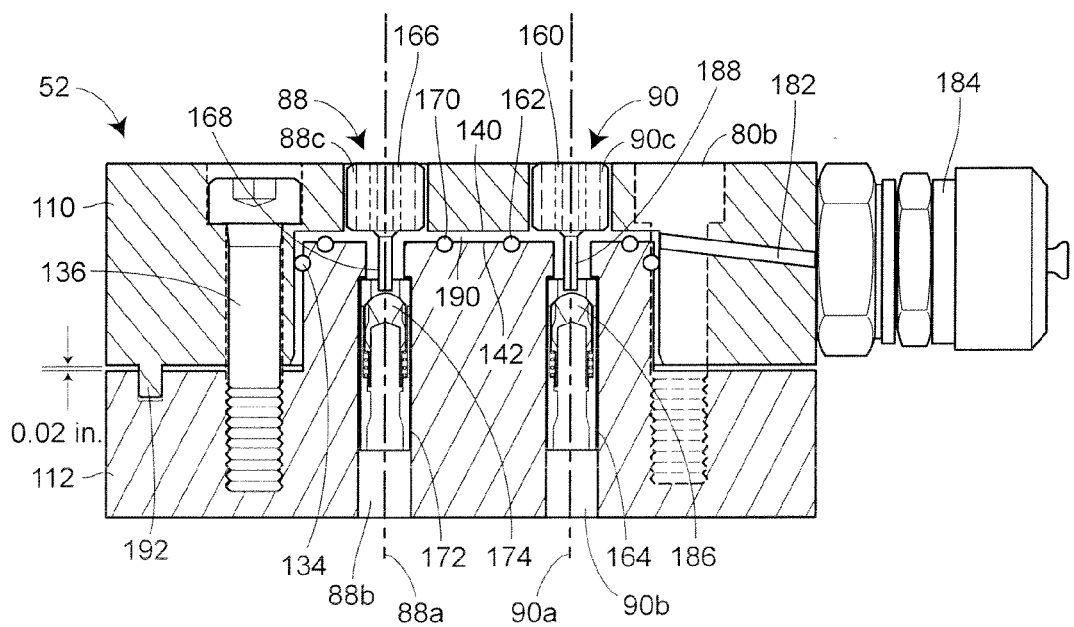
FIG. 7B is a view along sectioning line B-B of a hydraulic isolating manifold of FIG. 2, showing the disassembly of the adaptor from the base, with a gap opened between them of about 0.02 inches.

FIGS. 7A and 7B, illustrate the operation of the isolating manifold 52 as the four adaptor-to-base mounting bolts 136 are first loosened and the process of withdrawing these bolts (and thus the process of removing the adaptor 110 from the base 112) is begun. A mounting bolt 136*b* is shown in FIGS. 7A and 7B in a slightly loosened position with the gap between the adaptor 110 and the base 112 opened to about 0.02 inches. At this stage, the cavity 190 formed between the raised middle portion 112*a* of the base 112 and the surface 142 of the adaptor 110 begins to be exposed to one or more of the fluid channels 86*b*-*c*, 88*b*-*c* and 90*b*-*c*. In particular, at this point, the O-rings 130, 170 and 162 disposed around the tank channel 86*b* and 86*c*, the A control channel 88*b* and 88*c* and the B control channel 90*b* and 90*c* lose their sealing effectiveness (i.e., are compromised), thereby fluidly connecting the A control port 88 and the B control port 90 to the tank port 86 through the cavity 190. However, the O-ring 134 still isolates the cavity 190 from the exterior of the isolating manifold 52, and O-ring 120, which is in a depressed region with respect to the wall 142 still operates to isolate the pressure port 84 from the cavity 190. As will be seen, the push-pin fittings 166 and 160 in the A and B control channels 88*c* and 90*c* as well as the push-pin fitting 114 associated with the pressure channel 84 still operate to force the ball 174 of the check valve assembly 172, the ball 186 of the check valve assembly 164 and the ball 124 of the check valve assembly 122 into a slightly open position, thus allowing for fluid flow through each of the four channels according to the configuration of the valve attached to the adaptor 110, except that pressurized fluid may flow from the A control port 88 and the B control port 90 into the tank channel 86*b*. Although the ball 124 of the check valve assembly 122 is in a slightly open position, the O-ring 120 associated with the pressure port 84 still functions as a seal, and thus hydraulically isolates the pressure channels 84*b* and 84*c* from the other ports and channels.

Moreover, the pressure take-off channel 182 is exposed to any hydraulic fluid pressure that may exist within the cavity 190 created between the adaptor 110 and the base 112. Thus, as a safety precaution, a pressure gauge may be attached to the pressure fitting 184 and be used to check the pressure within the cavity 190 before completely separating the adaptor 110 from the base 112. In particular, it may be desirable to connect a pressure gauge to the pressure fitting 184 in order to verify that no or very little pressure differential exists between the cavity 190 and atmospheric pressure before complete separation of the adaptor 110 and the base 112 proceeds.

Figure 8A:
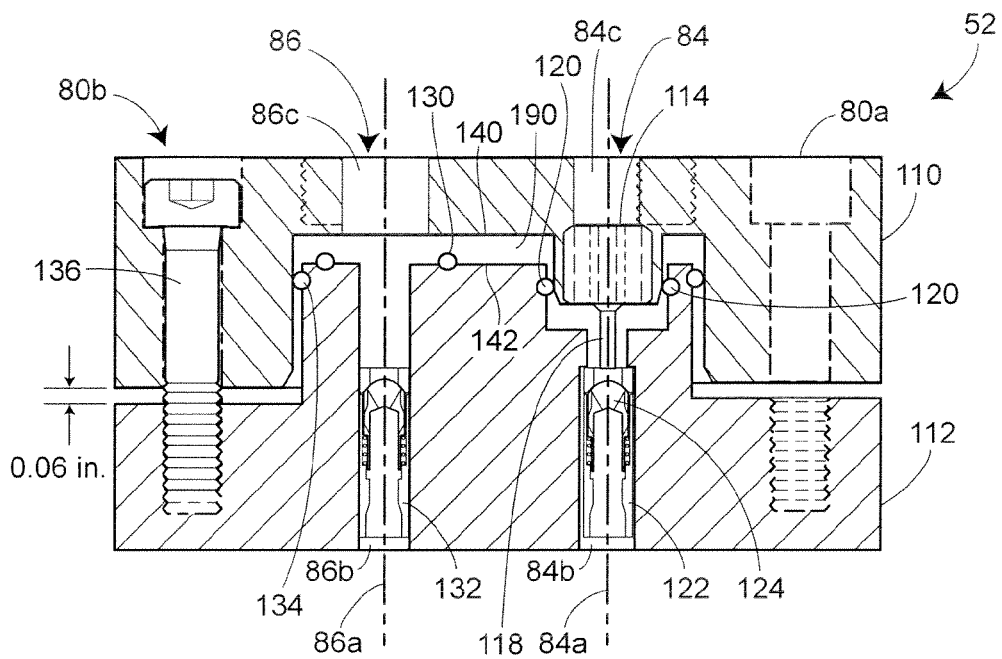
FIG. 8A is a view along sectioning line A-A of a hydraulic isolating manifold of FIG. 2, showing the disassembly of the adaptor from the base, with a gap opened between them of about 0.06 inches.
Figure 8B:
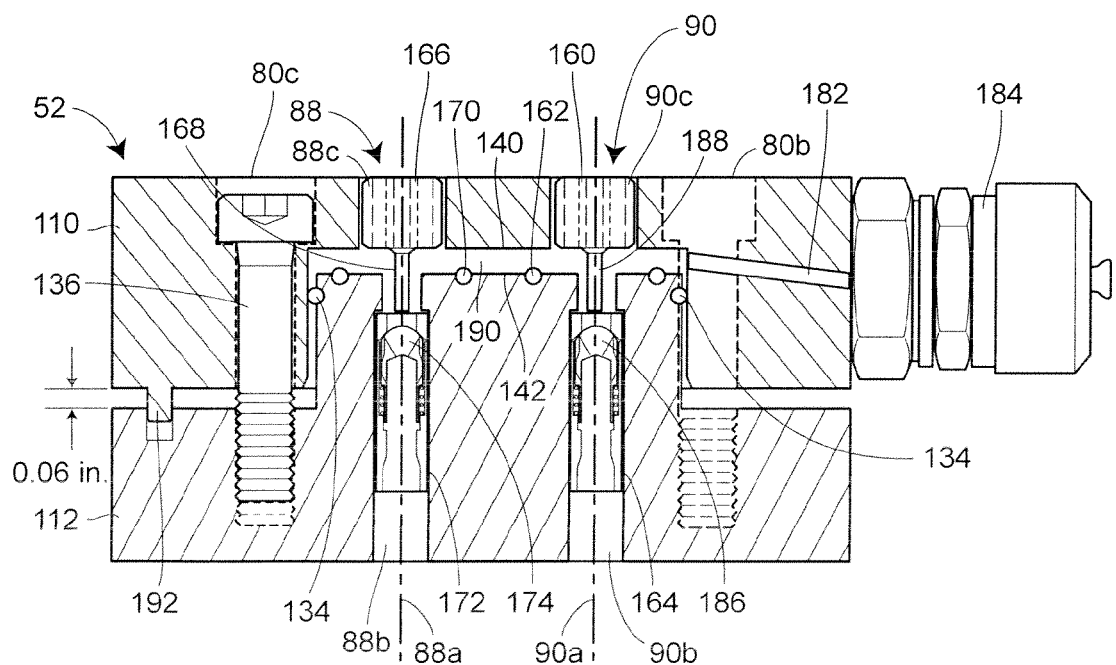
FIG. 8B is a view along sectioning line B-B of a hydraulic isolating manifold of FIG. 2, showing the disassembly of the adaptor from the base, with a gap opened between them of about 0.06 inches.

Next, as illustrated in FIGS. 8A and 8B, as the four adaptor-to-base mounting bolts 136 are loosened even further, the gap between the adaptor 110 and the base 112 opens to about 0.06 inches. At this point, the spring-loaded balls 124, 174, 186 of the check valve assemblies 122, 172, 164, respectively, are now in the fully closed position because the push-pins 118, 168, 188 which operate as actuator members no longer contact these balls. The A control port 88 and the B control port 90 are still connected to the tank port 86 (and the tank channels 86*b* and 86*c*) via the cavity 190, whereas the pressure port 84 and the pressure channels 84*b* and 84*c* remain isolated from each of the A control port 88, the B control port 90 and the tank port 86. Importantly, at this point in the removal process, the check valve assemblies 122, 172 and 164 along with their associated push-pin fittings 114 160 and 166 interact to block the pressure port 84, the A control port 88 and the B control port 90 from the corresponding pressure and control channels within the control manifold 10, thereby isolating the fluid channels within the control manifold 10 which may contain pressurized fluid from the valve attached to the adaptor 110 (the tank channel 86b is always at low pressure). Moreover, the O-ring 120 associated with the pressure channels 84b and 84c still functions as a seal at this time, and thus hydraulically isolates the pressure port 84 from the other ports. Likewise, the entire cavity 190 is still isolated from the exterior of the isolating manifold 52 by the larger O-ring 134. Thus, the cavity 190 now allows for the transfer of any residual pressurized hydraulic fluid that may be disposed within any of the A and B control channels of the adaptor 110 or within these channels of the valve attached to the adaptor 110 to flow past the check valve assembly 132 and into the tank, thereby bleeding any pressure within the A and B control channels within the valve to the tank. (It should be noted that the source of the pressure within these channels, i.e., the pressure port 84, has been blocked from the valve so that this bleeding will be effective to remove high pressure fluid from these portions of the valve and from the A and B control channels within the adaptor 110).

Figure 9A:
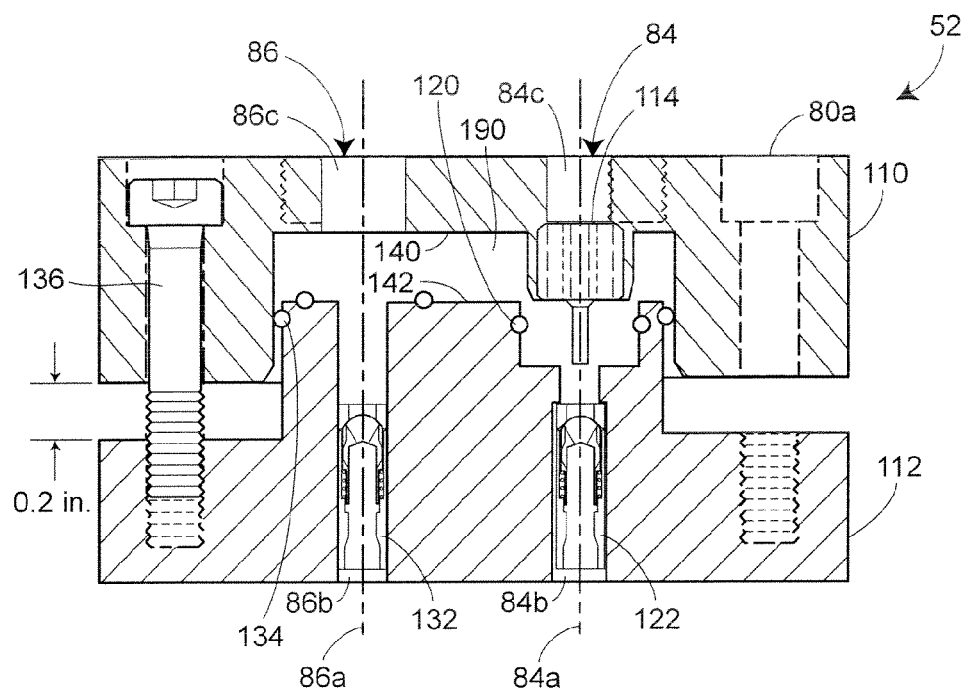
FIG. 9A is a view along sectioning line A-A of a hydraulic isolating manifold of FIG. 2, showing the disassembly of the adaptor from the base, with a gap opened between them of about 0.22 inches.
Figure 9B:
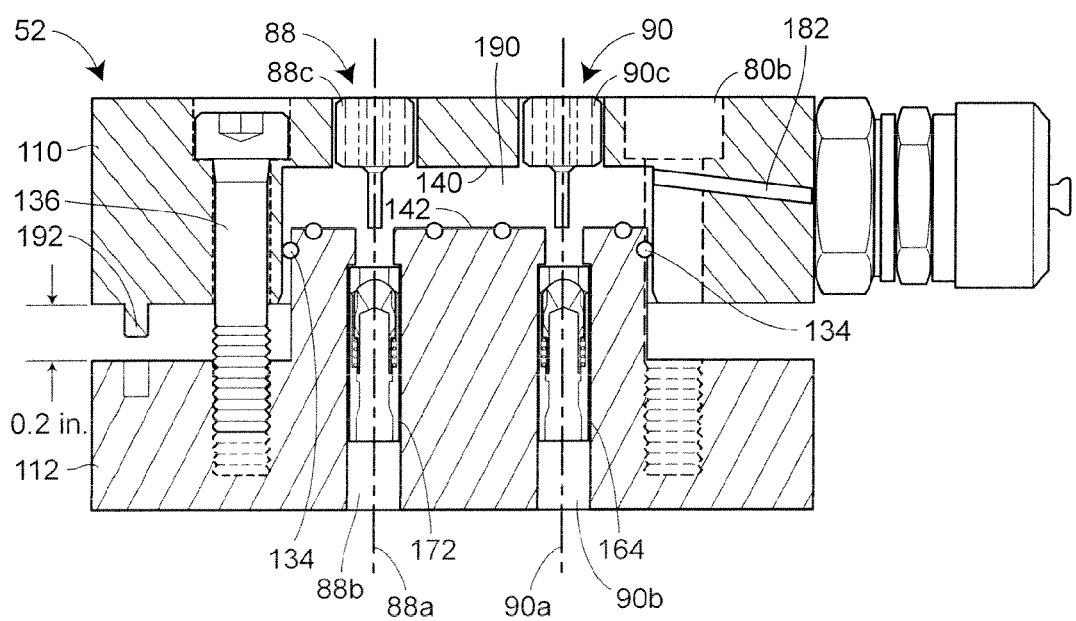
FIG. 9B is a view along sectioning line B-B of a hydraulic isolating manifold of FIG. 2, showing the disassembly of the adaptor from the base, with a gap opened between them of about 0.22 inches.

FIGS. 9A and 9B illustrate the operation of the isolating manifold 52 when the four adaptor-to-base mounting bolts 136 are loosened even further, with the gap between the adaptor 110 and the base 112 opened to about 0.22 inches. At this point in the disassembly process, the extended or raised portion of the adaptor 110 holding the push-pin fitting 114 exits the corresponding recessed portion of the base 112 so that the O-ring 120 loses its sealing effectiveness, thereby fluidly connecting the pressure port 84 to the tank port 86, the A control port 88 and B control port 90 via the cavity 190. This connection now bleeds the pressure port 84 of the valve through the cavity 190 to the tank (via the check valve 132) and thus removes any residual pressure within the pressure channel 84b and any valve channel attached to the port 84. Because the spring-loaded check valve assemblies 122, 172, 164 are in the fully closed position (preventing flow through them), only the spring-less check valve assembly 132 allows free fluid flow, and does only in the direction towards the tank.

At this point in the disassembly process, the O-ring 134 still isolates the entire four-port area within the cavity 190 from the exterior of the isolating manifold 52. However, before completely separating the adaptor 110 from the base 112, it may be desirable to perform a pressure check of the cavity 190 as a safety precaution, as further disassembly will eventually break the seal of the O-ring 134 causing it to lose its sealing effectiveness. In particular, at this point, the pressure at the pressure take-off channel 182 should have been already bled into the tank, making the pressure reading at the port 184 effectively zero or atmospheric pressure (i.e., the tank pressure). The presence of pressurized hydraulic fluid could pose a serious health risk to whoever performs any further disassembly. As the pressure take-off channel 182 is exposed to any hydraulic fluid pressure that may exist within the cavity 190 created between the adaptor 110 and the base 112, a pressure gauge may be connected to the pressure fitting 184 in order to verify that no unwanted pressure exists in the cavity 190 before complete separation proceeds.

Figure 10A:
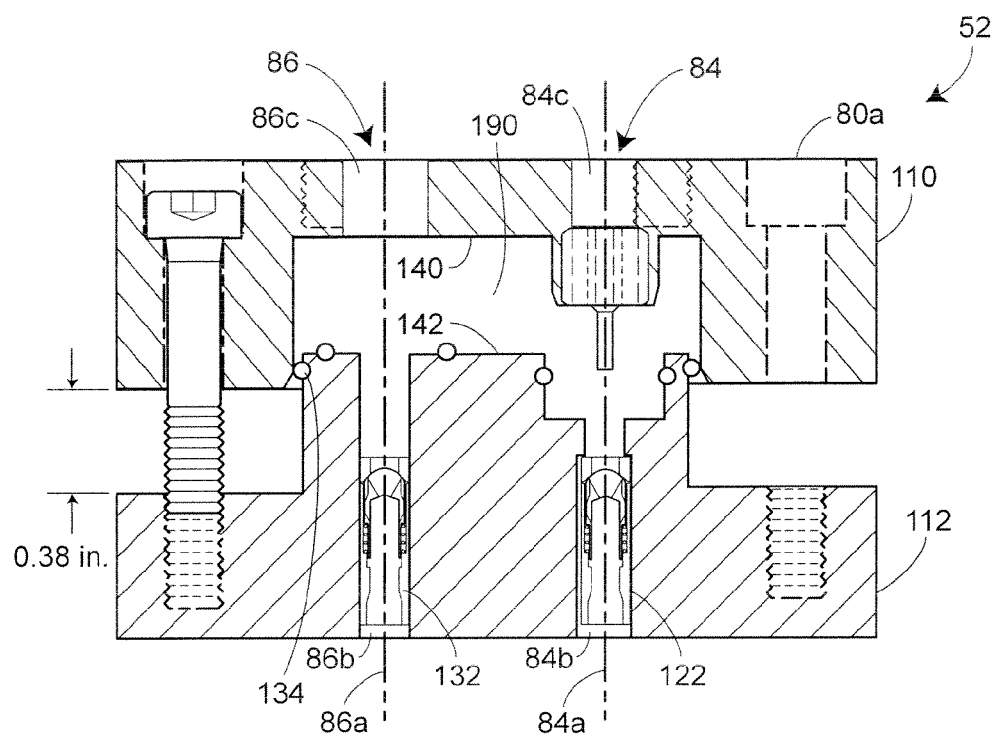
FIG. 10A is a view along sectioning line A-A of a hydraulic isolating manifold of FIG. 2, showing the disassembly of the adaptor from the base, with a gap opened between them of about 0.38 inches.
Figure 10B:
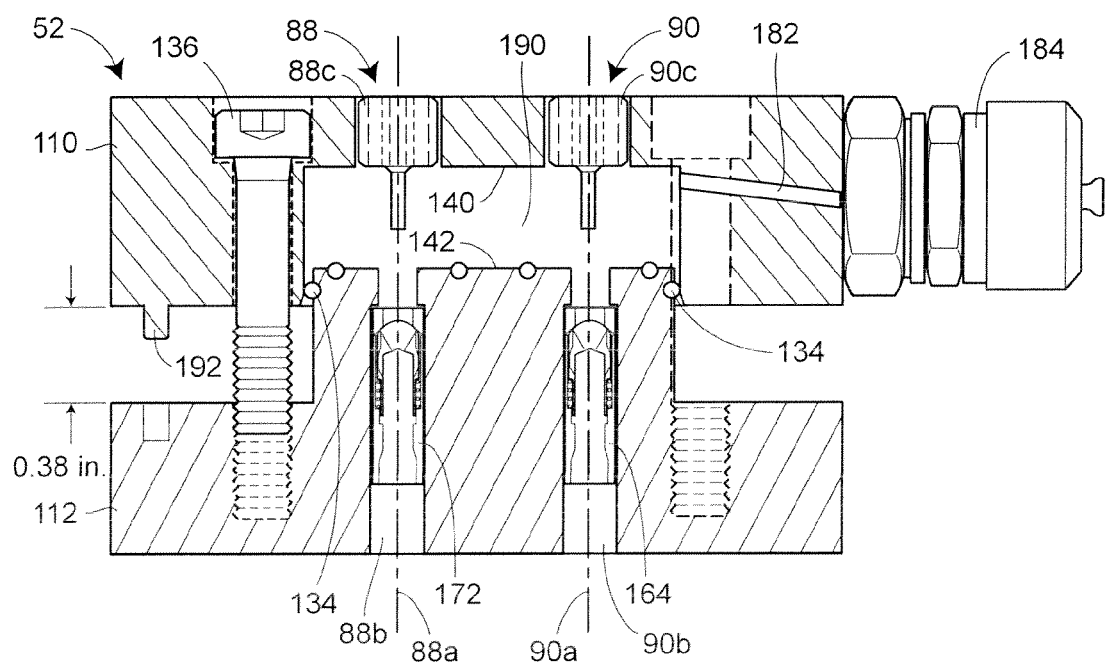
FIG. 10B is a view along sectioning line B-B of a hydraulic isolating manifold of FIG. 2, showing the disassembly of the adaptor from the base, with a gap opened between them of about 0.38 inches.

FIGS. 10A and 10B illustrate the operation of the isolating manifold 52 when the four adaptor-to-base mounting bolts 136 are loosened even further, to the point of unthreading completely from the base 112, with the gap between the adaptor 110 and the base 112 opened to about 0.38 inches. Here, the O-ring 134 still provides a seal between the exterior of the isolating manifold 52 and the cavity 190 and thus prevents any fluid within the cavity 190 from exiting. However, any fluid within the cavity 190 is at low pressure and the pressure channel 84b, the A control channel 88b and the B control channel 90b are blocked, and so there is no safety concern at this point.

Figure 11A:
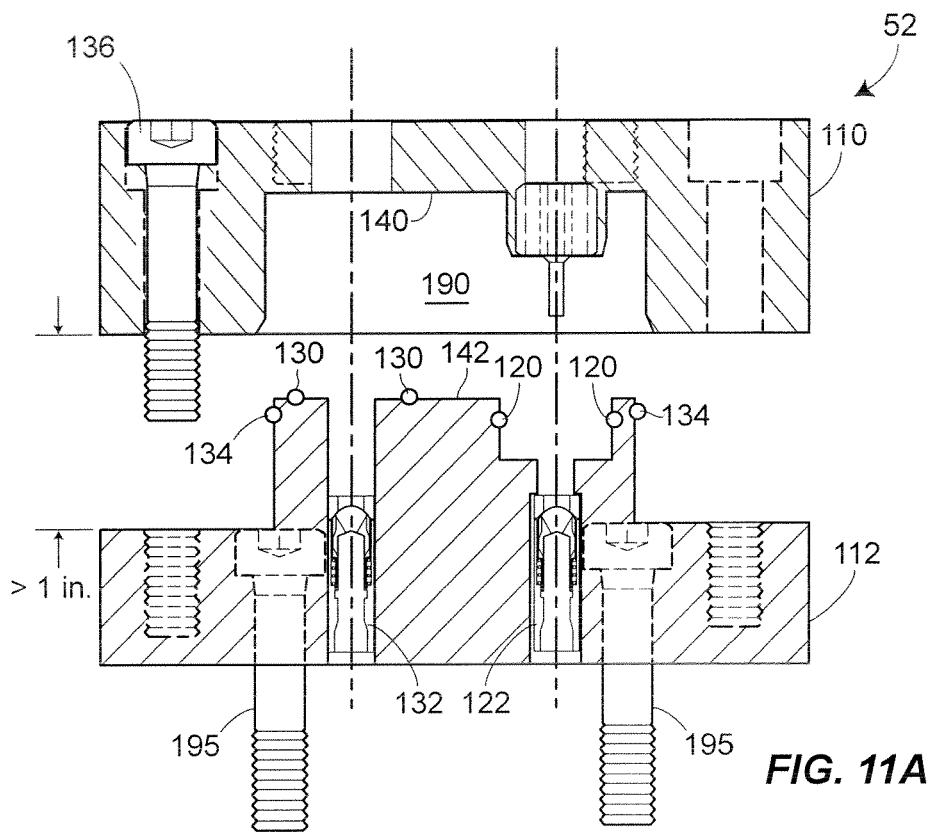
FIG. 11A is a view along sectioning line A-A of a hydraulic isolating manifold of FIG. 2, showing the adaptor completely disassembled from the base.
Figure 11B:
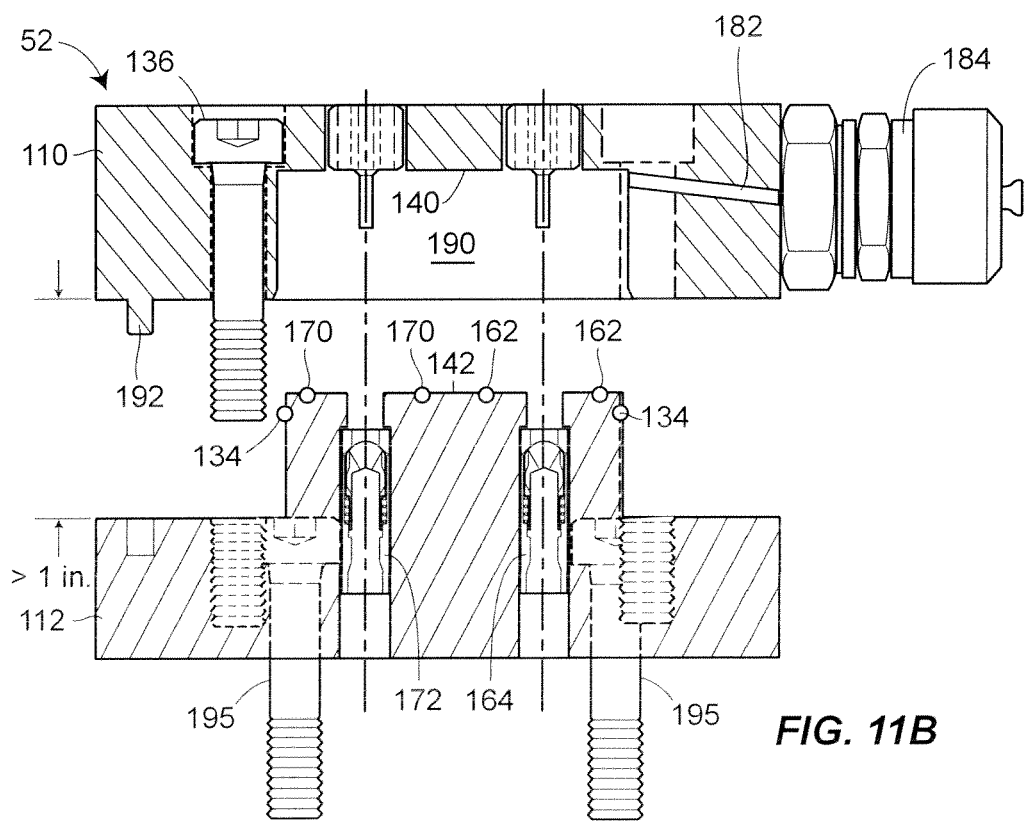
FIG. 11B is a view along sectioning line B-B of a hydraulic isolating manifold of FIG. 2, showing the adaptor completely disassembled from the base.

FIGS. 11A and 11B illustrate the isolating manifold 52 when the adaptor 110 is fully removed from the base 112 and thus when the four adaptor-to-base mounting bolts 136 are unthreaded completely from the base 112, with the gap between the adaptor 110 and the base 112 opened more than one inch. While the cavity 190 is exposed to the exterior of the isolating manifold 52, the base 112 is still connected to the control manifold 11 via bolts 195, and the check valve assemblies 122, 132, 164 and 172 operate to block the pressure channel 84b, the A and B control channels 88b and 90b and the tank channel 86b. At this point, the valve 30 mounted onto the adaptor 110 of the hydraulic isolating manifold 52 (see FIGS. 2 and 3), may now be safely disassembled from the adaptor 110, in the absence of any dangerous, highly pressurized hydraulic fluid. In a similar manner, other valves 32-44 may be safely removed from their respective hydraulic isolating manifolds 52.

Additionally, as will be seen from FIGS. 11A and 11B, connection structure in the form of holes through the base 112 accept bolts 195 (having threaded ends thereon) to attach the base 112 to threaded holes within the hydraulic manifold 10 (not shown). The holes within the base 112 includes recessed areas to accept the heads of the bolts 195, and these recessed area are covered by the adaptor 110 when the adaptor 110 is fully mounted onto the base 112. Thus, these recessed areas and the bolts 195 therein are only accessible when the adaptor 110 is completely removed from the base 112. As a result, a user cannot accidentally remove the bolts 195 when attempting to remove the adaptor 110 from the base 112, thereby providing an additional safety feature. For the sake of clarity of illustration only, the bolts 195 are only shown in FIGS. 11A and 11B, but exist in all of the configurations of FIGS. 4 and 6-11. Additionally, while only two bolts 195 are shown in each of FIGS. 11A and 11B (with a total of four bolts 195 being used in the illustrated configuration), any number of such bolts can be used, and generally speaking, these bolts will be covered by the edges 110a of the adaptor 110 when the adaptor 110 is attached to the base 112. Additionally, while not specifically shown, the O-rings 120, 130, 134, 170 and 162 may be disposed in depressions or channels formed in the surfaces of the adaptor 110 and base 112 to help retain these O-rings in place during the installation and removal processes described herein.

Of course, the process of attaching valve to a working manifold 10 may be performed by reversing the process illustrated in FIGS. 4-11. In particular, by reversing the process described above, the hydraulic isolating manifold 52 may be assembled, such that the adaptor 110 containing a pre-mounted valve 30 may be safely bolted onto a base 112 which is already mounted onto an operating hydraulic manifold 10. An alignment pin 192 (which is illustrated in dotted relief in the top view of FIG. 3 as well as in cross-sectional view in FIGS. 4B and 6B-11B) mounted in the adaptor 110 or the base 112 may be used to facilitate the proper alignment and mating of the adaptor 110 onto the base 112 to prevent misalignment of the ports 84, 86, 88 and 90 with the channels 84b, 86b, 88b and 90b.

During the connection process, the cavity 190 is first formed and is sealed by the O-ring 134 (FIGS. 10A-10B and 9A-9B). As assembly continues, the pressure channels 84b and 84c are isolated from the cavity 190 by the O-ring 120 (FIGS. 8A-8B) and the valve assemblies 122, 164 and 172 are then opened by the push-pins 118, 188 and 168 (FIGS. 7A-7B) to thereby fluidly connect the pressure port 84 to the pressure channel 84b and to fluidly connect the A and B control ports 88 and 90 to the cavity 190. Due to the recessed position of the O-ring 120, the pressure port 84 is sealed from the cavity 190 before its check valve assembly 122 is opened (see FIG. 8A), which eliminates the possibility of connecting the pressure port 84 to either the A control port 88, the B control port 90, or the tank port 86 before the adaptor 110 is fully connected to the base 112. This operation also eliminates the possibility of highly pressurized hydraulic fluid spewing forth between the adaptor 110 and the base 112, possibly causing equipment damage and/or human harm. Finally, during the assembly process, the tank port 86, the A control port 88 and the B control port 90 are isolated from the cavity 190 and from each other by the O-rings 130, 170 and 162 to thereby fully operatively connect the valve 30 to the manifold 10.

In the aforementioned embodiment, the valve 30, mounted onto the adaptor 110 of the isolating manifold 52, contains a diamond-shaped pattern of ports (pressure port 84, tank port 86, A control port 88, B control port 90) known in the industry as Directional Valve Pattern D03. Because the main function of directional valves in hydraulic systems is to direct and distribute flow as necessary according to design specifications, there exist many different styles of directional valves and hence Directional Valve Patterns in the industry. Thus, the hydraulic valve isolating manifold 52 may be constructed to have or support any different Directional Valve Pattern and still function similarly to the aforementioned embodiment, that is, to allow for the quick and safe removal and installation of a valve during continued hydraulic system operation. These other Directional Valve Patterns may contain a different number of ports than the four ports contained in Directional Valve Pattern D03, and these ports may be arranged in other different patterns, in accordance with the appropriate valve port specifications. Thus, for example, the number of fluid channels extending through the isolating manifold 52 may be more or less than four, and could, if desired, be only two channels which might, for example, be a pressure channel and a tank channel or a pressure channel and a control channel. Likewise, while use of a check valve in the base portion of the tank channel is desirable, it is not strictly necessary. Moreover, in some configurations, the use of a check valve or of a cooperating check valve and push-pin assembly in each fluid channel may not be necessary.

Still further, while the configuration of the isolating manifold 52 described herein includes a raised middle portion of a base that fits into a recessed portion of an adaptor with an O-ring disposed around the base, other configurations could be used to provide a sealed cavity to allow fluid flow through the various channels during assembly and disassembly of the manifold. Thus, for example, the adaptor could include a raised middle portion the fits into a recessed portion of the base.

Additionally, while the connection structure for connecting the adaptor to the base and the base to the control manifold is shown as including partially threaded bolt holes disposed in the adaptor and the base to accept threaded bolts therein, this connection structure could be made with other removable connection structure, including bolts sticking out of base and going through adaptor to accept nuts thereon or bolts extending from the control manifold which extend through holes in the base to accept nuts thereon. Of course, other connection structure could be used as well.

While the O-rings 130, 170 and 162 of the isolating manifold 52 have been described as losing their sealing effectiveness, during the disassembly process, prior to the check valves 132, 172 and 164 closing, the isolating manifold 52 could be configured so that the O-rings 130, 170 and 162 of the isolating manifold 52 lose their sealing effectiveness or are compromised, during the disassembly process, after or at the same time that the check valves 132, 172 and 164 close, it being more important that the sealing member associated with high pressurized fluid channels be effective until after the check valve in the corresponding fluid channel closes or blocks that channel.

While the present disclosure has been described with reference to specific examples, which are intended to be illustrative only and not to be limiting of the disclosure, it will be apparent to those of ordinary skill in the art that changes, additions, or deletions may be made to the disclosed embodiments without departing from the spirit and scope of the claimed invention.

What is claimed is:

1. A hydraulic manifold for use in hydraulically connecting a hydraulic component having a plurality of component fluid ports therein to a hydraulic control manifold having a plurality of hydraulic fluid channels to be connected to the plurality of component fluid ports, the hydraulic manifold comprising:
a first manifold member;
a second manifold member mountable onto the first manifold member; and
a first connection structure operable to removably mount the first manifold member onto the second manifold member in a number of different mounting positions, including a fully mounted position and one or more partially mounted positions;
wherein the first manifold member includes;
a second connection stricture to rigidly mount the hydraulic component onto the first manifold member;
a plurality of fluid ports, wherein each of the plurality of fluid ports aligns with a corresponding one of the of component fluid ports on the hydraulic component when the hydraulic component is mounted onto the first manifold member using the second connection structure;
a plurality of first fluid channels disposed through the first manifold member, wherein each of the plurality of first fluid channels terminates in a corresponding one of the plurality of fluid ports; and
an actuator associated with at least one of the first fluid channels; and wherein the second manifold member includes;
third connection structure to rigidly mount the second manifold member to the hydraulic control manifold;
a plurality of second fluid channels disposed through the second manifold member, wherein each of the plurality of second fluid channels mates with a corresponding one of the plurality of first fluid channels when the first and second manifold members are mounted together using the first connection structure; and
a check valve disposed in one of the second fluid channels, wherein the check valve operates to prevent the flow of hydraulic fluid from the hydraulic control manifold to the first manifold member when the second manifold member is mounted onto the hydraulic control manifold and the first manifold member is removed from the second manifold member, and wherein the check valve is actuated by the actuator when the first manifold member is mounted onto the second manifold member in the fully mounted position to allow hydraulic fluid to flow from the hydraulic control manifold to the first manifold member when the first manifold member is mounted onto the second manifold member in the fully mounted position.

2. The hydraulic manifold of claim 1, wherein one of the first and second manifold members includes a raised portion and the other one of the first and second manifold members includes a recessed portion sized to accept the raised portion and further including a first sealing member disposed between the raised portion of the one of the first and second manifold members and the recessed portion of the other one of the first and second manifold members.

3. The hydraulic manifold of claim 2, wherein the first sealing member comprises an O-ring.

4. The hydraulic manifold of claim 2, wherein a cavity is formed between the raised portion and the recessed portion when first manifold member and the second manifold member are mounted to each other in the one or more partially mounted positions and wherein the first sealing member is disposed between the raised portion and the recessed portion to seal the cavity in each of the one or more partially mounted positions.

5. The hydraulic manifold of claim 4, further including a second sealing member disposed in the cavity around an interface of a first one of the first fluid channels and a first one of the second fluid channels to seal the first one of the first fluid channels and the first one of the second fluid channels from the cavity when the first and second manifold members are mounted together in the fully mounted position, and including a third sealing member disposed in the cavity around an interface of a second one of the first fluid channels and a second one of the second fluid channels, wherein the second sealing member seals the second one of the first fluid channels and the second one of the second fluid channels from the cavity when the first and second manifold members are mounted together in the fully mounted position.

6. The hydraulic manifold of claim 5, wherein the second sealing member and the third sealing member each comprises an O-ring.

7. The hydraulic manifold of claim 5, wherein the second sealing member seals the first one of the first fluid channels and the first one of the second fluid channels from the cavity when the first and second manifold members are mounted together in a first partially mounted position and the third sealing member does not seal the second one of the first fluid channels and the second one of the second fluid channels from the cavity when the first and second manifold members are mounted together in the first partially mounted position and wherein the first sealing member seals the cavity in the first partially mounted position.

8. The hydraulic manifold of claim 7, wherein the actuator does not actuate the check valve assembly when the first and second manifold members are mounted together in the first partially mounted position and wherein the check valve assembly is disposed in the first one of the second fluid channels.

9. The hydraulic manifold of claim 8, wherein the second sealing member does not seal the first one of the first fluid channels and the first one of the second fluid channels from the cavity when the first and second manifold members are mounted together in a second partially mounted position and the third sealing member does not seal the second one of the first fluid channels and the second one of the second fluid channels from the cavity when the first and second manifold members are mounted together in the second partially mounted position, wherein the first and second manifold members must be moved into the first partially mounted position from the second partially mounted position to reach the fully mounted position and wherein the first sealing member seals the cavity in the second partially mounted position.

10. The hydraulic manifold of claim 4, further including a pressure take-off channel disposed through one of the first and second manifold members and fluidly connected to the cavity in at least one of the partially mounted positions.

11. The hydraulic manifold of claim 10, further including a pressure fitting coupled to the pressure take-off channel, the pressure fitting adapted to accept a pressure gauge.

12. The hydraulic manifold of claim 1, wherein the actuator is a push-pin assembly.

13. The hydraulic manifold of claim 12, wherein the check valve assembly includes a spring that normally biases a valve component against a seat to prevent fluid flow through the check valve assembly.

14. The hydraulic manifold of claim 12, wherein the push-pin assembly includes a push-pin and a head having a flow passage therethrough, and wherein the push-pin assembly is mounted in the at least one of the first fluid channels to allow fluid within the at least one of the first fluid channels to flow through the flow passage of the head.

15. The hydraulic manifold of claim 1, wherein the first connection structure comprises a bolt hole disposed through one of the first and second manifold members and adapted to accepted a threaded end of a bolt therethrough and a threaded hole disposed in the other of the first and second manifold members adapted to mate with the threaded bolt.

16. The hydraulic manifold of claim 1, wherein the second connection structure comprises a bolt hole having a threaded end adapted to mate with a threaded bolt.

17. The hydraulic manifold of claim 1, wherein the second connection structure comprises a bolt having a threaded end adapted to mate with a nut.

18. The hydraulic manifold of claim 1, wherein the third connection structure comprises one or more bolt holes disposed through the second manifold member adapted to accept one or more bolts having threaded ends which mate with one or more threaded holes in the control manifold.

19. The hydraulic manifold of claim 18, wherein the one or more bolt holes each include a recessed portion adapted to accept a head of the bolt having a threaded end that mates with one of the threaded holes in the control manifold, wherein the recessed portion is covered by the first manifold member when the first manifold member is mounted onto the second manifold member in the fully mounted position using the first connection structure.

20. The hydraulic manifold of claim 1, wherein a corresponding pair of first fluid channels and second fluid channels are aligned along a center line when the first manifold member is mounted onto the second manifold member in the fully mounted position.

21. An isolating manifold for use in hydraulically connecting a first hydraulic component to a second hydraulic component, the isolating manifold comprising:
a first manifold member having a first surface and having a second surface with a plurality of first manifold member ports therein to mate with the first hydraulic component;
a second manifold member having a first surface and having a second surface having a plurality of second manifold member ports to mate with the second hydraulic component;
connection structure operable to removably mount the first manifold member onto the second manifold member in a number of different mounting positions, including a fully mounted position and one or more partially mounted positions, wherein the first surface of the first manifold member is disposed adjacent to the first surface of the second manifold member when the first and second manifold members are disposed in the fully mounted position and wherein the first surface of the first manifold member moves progressively further away from the first surface of the second manifold member when the first and second manifold members are moved from the fully mounted position through successive ones of the plurality of partially mounted positions, and wherein the first surface of the first manifold member and the first surface of the second manifold member define walls of a cavity formed between the first manifold member and the second manifold member as the first manifold member is moved away from the second manifold member;

a plurality of fluid channels formed through the first and second manifold members, wherein each fluid channel has a first channel portion extending through the first manifold member from the first surface of the first manifold member to the second surface of the first manifold member, and a second channel portion extending through the second manifold member from the first surface of the second manifold member to the second surface of the second manifold member, and wherein the first and second channel members of each fluid channel are aligned at the interface between the first surface of the first manifold member and the first surface of the second manifold member when the first and second manifold members are mounted in the fully mounted position;

a check valve assembly and an actuator member disposed within a first one of the fluid channels, wherein the check valve assembly and the actuator member interact to allow fluid to flow through the first one of the fluid channels when the first and second manifold members are mounted in the fully mounted position and interact to prevent fluid flow through the first one of the fluid channels when the first and second manifold members are mounted in one or more of the partially mounted positions;

a first sealing member disposed around each of the plurality of fluid channels to seal the fluid channel from the cavity when the first and second manifold members are mounted in the fully mounted position, and wherein each first sealing member loses sealing effectiveness when the first and second manifold members are mounted in at least one of the various partially mounted positions to thereby open the fluid channel associated with the sealing member to the cavity; and a further sealing member disposed between the first and second manifold members to seal the cavity from an exterior of the isolating manifold when the first and second manifold members are mounted in each of the partially mounted positions.

22. The isolating manifold of claim 21, wherein the plurality of fluid channels includes at least two fluid channels, wherein the first one of the fluid channels is a pressure channel that provides pressurized fluid between the second hydraulic component and the first hydraulic component and wherein a second one of the fluid channels is a tank fluid channel that connects the first hydraulic component to a low pressure channel within the second hydraulic component, and wherein the first sealing member associated with the second one of the fluid channels loses sealing effectiveness in a first one of the partially mounted positions and the sealing member associated with the first one of the fluid channels loses sealing effectiveness in a second one of the partially mounted positions, wherein the first partially mounted position is closer to the fully mounted position than the second partially mounted position.

23. The isolating manifold of claim 22, wherein a second check valve is disposed in the second one of the fluid channels and operates to enable fluid to flow from the first hydraulic component to the second hydraulic component and to prevent fluid flow from the second hydraulic component to the first hydraulic component.

24. The isolating manifold of claim 23, wherein the second check valve opens in response to fluid pressure.

25. The isolating manifold of claim 22 wherein the plurality of fluid channels includes a third fluid channel and further including a further check valve assembly and a further actuator disposed within the third fluid channel.

26. The isolating manifold of claim 25, wherein the first sealing member associated with the third fluid channel loses sealing effectiveness to expose the third fluid channel to the cavity in a further partially mounted position, wherein the further partially mounted position is closer to the fully mounted position than the second partially mounted position.

27. The isolating manifold of claim 26, wherein the further partially mounted position is the first partially mounted position.

28. The isolating manifold of claim 21, wherein the actuator member and check valve assembly interact to block the first one of the fluid channels in a first partially mounted position and the first sealing member loses effectiveness and exposes the first fluid channel to the cavity in a second partially mounted position, wherein the first partially mounted position is closer to the fully mounted position than the second partially mounted position.

29. The isolating manifold of claim 21, further including first connection structure disposed in the first and second manifold members to enable the first and second manifold members to be mounted in the fully mounted position and in each of the partially mounted positions.

30. The isolating manifold of claim 29, wherein the first connection structure includes one or more holes disposed in the first and second manifold members and one or more bolts which cooperate with the one or more holes to attach the first and second manifold members together.

31. The isolating manifold of claim 29, further including second connection structure disposed on the second manifold member to rigidly attach the second manifold member to the second hydraulic component.

32. The isolating manifold of claim 31, wherein the second connection structure includes bolt holes extending through at least a portion of the second manifold member to enable a bolt to be inserted through the second manifold to cooperate with threads on the second hydraulic component and wherein the bolt holes on the second manifold member are covered by the first manifold member when the first and second manifold members are mounted in the fully mounted position.

33. The isolating manifold of claim 21, wherein the plurality of fluid channels includes at least three fluid channels, including the first one of the fluid channels and a second fluid channel and a third fluid channel, wherein the check valve assembly and the actuator member disposed within the first one of the fluid channels interact to block the first one of the fluid channels in a first and each subsequent partially mounted position, wherein the first sealing members associated with the second and third fluid channels lose sealing effectiveness in a second partially mounted position to expose the second and third fluid channels to the cavity in the second and each subsequent partially mounted position, and wherein the first sealing member associated with the first one of the fluid channels loses sealing effectiveness in a third partially mounted position to expose the first one of the fluid channels to the cavity in the third and each subsequent partially mounted position, wherein the first and second partially mounted positions are closer to the fully mounted position than the third partially mounted position.

34. The isolating manifold of claim 33, including a further check valve assembly and a further actuator member disposed within the second fluid channel, wherein the further check valve assembly and the further actuator member interact to allow fluid to flow through the second fluid channel when the first and second manifold members are mounted in the fully mounted position and interact to prevent fluid from flowing through the further check valve assembly to the first hydraulic component when the first and second manifold members are mounted in the first partially mounted position.

35. The isolating manifold of claim 34, further including a third check valve assembly disposed in the third fluid channel.

36. The isolating manifold of claim 35, wherein the first one of the fluid channels is a pressure channel that provides pressurized fluid between the second hydraulic component and the first hydraulic component, the second fluid channel is a control fluid channel that provides pressurized fluid between the first hydraulic component and the second hydraulic component in response to the operation of the first hydraulic component and the third fluid channel is a tank fluid channel that connects the first hydraulic component to a low pressure fluid channel within the second hydraulic component.

37. A method of automatically fluidly isolating a first hydraulic component from a second hydraulic component when the first and second hydraulic components are fluidly connected together via two or more fluid channels, the method comprising:
  enabling a user to actuate a connection structure that connects a first manifold member, connected to the first hydraulic component, to a second manifold member, connected to the second hydraulic component, to move the first manifold member away from the second manifold member through a series of partially mounted positions defined between a fully mounted position and an unmounted position;
  forming a cavity between the first and second manifold members as the first and second mounting members are moved from the fully mounted position through each of the partially mounted positions to the unmounted position;
  sealing the cavity from the external atmosphere when the first and second manifold members are mounted in the fully mounted position and in each of the partially mounted positions;
  sealing each of the plurality of fluid channels from the cavity when the first and second manifold members are mounted in the fully mounted position;
  compromising the seal between a first fluid channel and the cavity to allow fluid to flow between the first fluid channel and the cavity at a first partially mounted position;
  blocking a second fluid channel to prevent fluid flow from the second hydraulic component to the first manifold member at a second partially mounted position;
  compromising the seal between the second fluid channel and the cavity to allow fluid to flow between the second fluid channel and the cavity at a third partially mounted position, wherein the third partially mounted position is between the unmounted position and the second partially mounted position.

38. The method of claim 37, wherein the third partially mounted position is also between the unmounted position and the first partially mounted position.

39. The method of claim 37, wherein the second partially mounted position is between the third partially mounted position and the first partially mounted position.

40. The method of claim 37, wherein the second partially mounted position is between the fully mounted position and the first partially mounted position.

41. The method of claim 37, further including compromising the seal between a third fluid channel and the cavity to allow fluid to flow between the third fluid channel and the cavity at one of the partially mounted positions and blocking the third fluid channel to prevent fluid flow between the second manifold member and the first manifold member in another one of the partially mounted positions.

42. The method of claim 41, wherein the one of the partially mounted positions is the first partially mounted position and the another one of the partially mounted positions is the second partially mounted position.

43. The method of claim 37, further including blocking the second fluid channel to prevent flow of fluid from the second hydraulic component to the first manifold member or to the cavity in the fully mounted position and in each of the partially mounted positions.

* * * * *

UNITED STATES PATENT AND TRADEMARK OFFICE
CERTIFICATE OF CORRECTION

| | | |
|---|---|---|
| PATENT NO. | : 7,909,064 B2 | Page 1 of 1 |
| APPLICATION NO. | : 11/836986 | |
| DATED | : March 22, 2011 | |
| INVENTOR(S) | : Richard P. Natili, Jr. et al. | |

It is certified that error appears in the above-identified patent and that said Letters Patent is hereby corrected as shown below:

In the Claims:

At Column 16, line 28, "stricture" should be -- structure --.

Signed and Sealed this
Twenty-eighth Day of February, 2012

David J. Kappos
*Director of the United States Patent and Trademark Office*